(12) United States Patent
Jain et al.

(10) Patent No.: US 11,645,144 B2
(45) Date of Patent: May 9, 2023

(54) METHODS AND SYSTEMS SECURING AN APPLICATION BASED ON AUTO-LEARNING AND AUTO-MAPPING OF APPLICATION SERVICES AND APIS

(71) Applicant: VMware, Inc., Palo Alto, CA (US)

(72) Inventors: Amit Jain, Santa Clara, CA (US); Gopi Krishna, Saratoga, CA (US); Pratik Roychowdhury, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 582 days.

(21) Appl. No.: 16/694,823

(22) Filed: Nov. 25, 2019

(65) Prior Publication Data

US 2020/0302050 A1 Sep. 24, 2020

Related U.S. Application Data

(60) Provisional application No. 62/821,452, filed on Mar. 21, 2019.

(51) Int. Cl.
*G06F 11/00* (2006.01)
*G06F 11/07* (2006.01)
*G06F 11/30* (2006.01)
*H04L 41/50* (2022.01)
*H04L 67/51* (2022.01)

(52) U.S. Cl.
CPC ........ *G06F 11/0793* (2013.01); *G06F 11/302* (2013.01); *H04L 41/5058* (2013.01); *H04L 67/51* (2022.05)

(58) Field of Classification Search
CPC ............... G06F 11/0793; G06F 11/302; G06F 11/0709; G06F 11/079; G06F 11/0766; G06F 11/0781; G06F 11/3006; G06F 11/3051; G06F 11/3438; G06F 11/2257; H04L 67/51; H04L 41/5058
See application file for complete search history.

(56) References Cited

U.S. PATENT DOCUMENTS

| | | | |
|---|---|---|---|
| 10,681,012 B2* | 6/2020 | Subbarayan | ........ H04L 63/1425 |
| 2016/0342453 A1* | 11/2016 | Khan | .................. G06F 11/0793 |
| 2019/0213326 A1* | 7/2019 | Dykes | .................... G06N 20/00 |
| 2021/0374027 A1* | 12/2021 | Joglekar | ............. G06F 11/3072 |

* cited by examiner

*Primary Examiner* — Joseph D Manoskey

(57) ABSTRACT

A computerized method for securing an application based on auto-learning and auto-mapping of application services and application programming interfaces (APIs), includes the step of providing a distributed application security mesh system. The method includes the step of implementing a learning mode of the distributed application security mesh system. This includes learning a set of services and a set of APIs that are used by the set of services to interact with each other. The service comprises an application service. This includes creating a record of the set of services. The record comprises a list of services that are currently active in a specified environment of the distributed application security mesh system, and a list of interactions of the services. The method includes the step of implementing an enforcing mode of the distributed application security mesh system. This includes determining that there is a deviation from a state of at least one record of the set of services provided during the learning mode. This includes implementing a mechanism for the review of the deviations by administrators of the systems and updating the learned state or to take an action based on the review.

17 Claims, 25 Drawing Sheets

METHODS AND SYSTEMS SECURING AN APPLICATION BASED ON AUTO-LEARNING AND AUTO-MAPPING OF APPLICATION SERVICES AND APIS

CROSS-REFERENCE TO RELATED APPLICATIONS

This application claims priority to U.S. provisional patent application No. 62/821,452, titled METHODS AND SYSTEMS OF DISTRIBUTED APPLICATION SECURITY MESH and filed on 21 Mar. 2019. This application is hereby incorporated by reference in its entirety.

BACKGROUND

As the continuous development of cloud computing develops, various types of cloud-native applications are being deployed. Tradition methods of providing security for non-cloud-native applications may not be adequate for cloud-native. Accordingly, these cloud-native applications require a different approach to security. In this way, improvements to securing an application based on auto-learning and auto-mapping of application services and APIs are desired.

BRIEF SUMMARY OF THE INVENTION

In one aspect, a computerized method for securing an application based on auto-learning and auto-mapping of application services and application programming interfaces (APIs), includes the step of providing a distributed application security mesh system. The method includes the step of implementing a learning mode of the distributed application security mesh system. This includes learning a set of services and a set of APIs that are used by the set of services to interact with each other. The service comprises an application service. This includes creating a record of the set of services. The record comprises a list of services that are currently active in a specified environment of the distributed application security mesh system, and a list of interactions of the services. The method includes the step of implementing an enforcing mode of the distributed application security mesh system. This includes determining that there is a deviation from a state of at least one record of the set of services provided during the learning mode. This includes implementing a mechanism for the review of the deviations by administrators of the systems and updating the learned state or to take an action based on the review.

Figure 1:
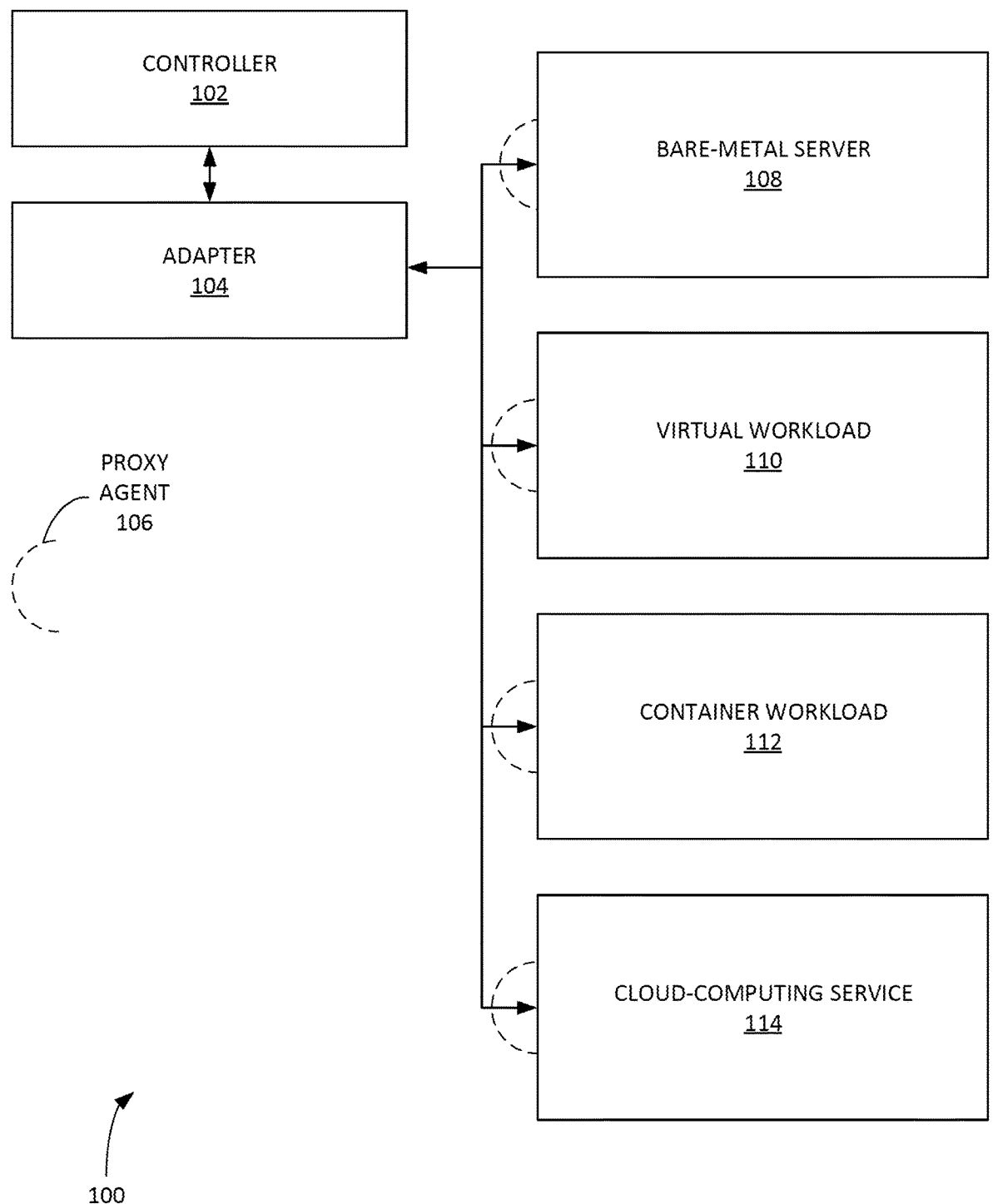
FIG. 1 is a simplified block diagram of distributed application security mesh system, according to some embodiments.

The Figures described above are a representative set and are not an exhaustive with respect to embodying the invention.

DESCRIPTION

Disclosed are a system, method, and article for securing an application based on auto-learning and auto-mapping of application services and APIs. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Adapter can be an optional intermediary element that is deployed between controller and the distributed proxy agent.

Application programming interface (API) can specify how software components of various systems interact with each other.

Application security mesh can be a distributed security solution.

Cloud computing can involve deploying groups of remote servers and/or software networks that allow centralized data storage and online access to computer services or resources. These groups of remote serves and/or software networks can be a collection of remote computing services.

Controller can provide a centralized policy management and operational view. The controller acts a central control point for configuring various elements and policies. The controller also acts as an aggregation point for collecting telemetry data from distributed security mesh proxy agents and to execute various analytics to provide various insights into mesh's operation. These insights can include, inter alia: security insights, performance related insights or operational related insights.

Distributed Proxy Agent (also called a proxy agent herein) can be an element that is inserted in a distributed manner to provide distributed telemetry collection and policy enforcement points. Distributed Proxy Agent can be deployed in various form factors including, but not limited to, a software only solution that can be run in either a publicly available computer hosting environment (e.g. in a cloud-computing platform) and/or in the customer's environment. Distributed Proxy Agent can also be deployed as a purpose made hardware appliance or software only appliance in either a publicly available computer hosting environment (e.g. in a cloud-computing platform) and/or in the customer's environment.

Transport Layer Security (TLS), and its now-deprecated predecessor is a cryptographic protocol designed to provide communications security over a computer network.

Example Systems

Example systems provide a computer security solution for distributed applications. It is noted that, in a distributed application, various components of the application interact with each other using APIs. The distributed application can be secured by auto-learning of the applications APIs. Example system can auto learn, inter alia: APIs, the schema, behavior and usage pattern of APIs. This information can then use the auto-learned information to provide security to the application. This solution is deployed in a distributed manner. In an example deployment, the system can have three main components as provided in the discussion infra. This example deployment is provided by way of example and not of limitation. Other example deployment topologies can include various permutations thereof.

FIG. 1 is a simplified block diagram of distributed application security mesh system 100, according to some embodiments. Application security mesh system 100 includes, inter alia, three components: controller 102, adapter 104 and proxy agent 106.

Controller 102 provides a centralized policy management and operational view. Additional information about controller 102 is provided in the description of FIGS. 2 and 8 infra.

System 100 includes adapter 104. Adapter 104 can be a gateway that acts as an aggregation point for policy download and telemetry upload to controller 102. Additional information about adapter 104 is provided in the description of FIGS. 2 and 9 infra. It is noted that adapter 104 can be optional in some example embodiments. As an optional element, in application security mesh system 100, when adapter 104 is not deployed, a proxy agent 106 can use the adapter functionalities while working with controller 102 directly without having an intermediate adapter element.

Proxy agent 106 can be a distributed element that is inserted in the request path of every application. Proxy agent 106 can provide both security policy and telemetry enforcement. Proxy agent 106 can have different implementations and insertion mechanisms to meet requirements of different deployment environments. Example employment environments include, inter alia: bare-metal server 108, virtual workload 110, container workload 112, various cloud-computing platforms 114, etc. Additional information about proxy agent 106 is provided in the description of FIGS. 2 and 10 infra.

Figure 2:
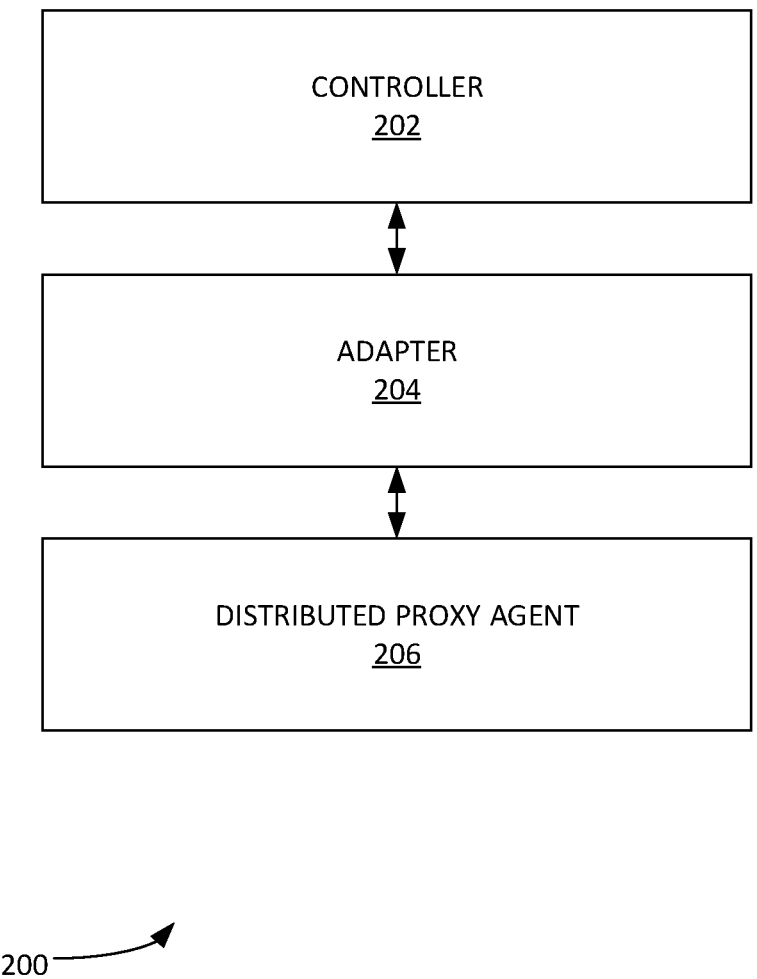
FIG. 2 illustrates an additional simplified block diagram of distributed application security mesh system, according to some embodiments.

FIG. 2 illustrates an additional simplified block diagram of distributed application security mesh system 200, according to some embodiments. Distributed application security mesh system 200 can be used to supplement distributed application security mesh system 100.

Controller 202 provides a centralized policy management and operational view. Controller 202 acts a central control point for configuring various elements and policies within a security mesh. Controller 202 also acts as an aggregation point for collecting telemetry data from distributed security mesh proxy agents and to execute various analytics to provide various insights into security mesh system's operation. The insights may include, inter alia: security insights, performance related insights or operational related insights, etc. Centralized controller functionality can include, inter alia, various functions, such as: the ability to allow various administrative users to login and configure the various policies to be applied to security mesh. It is noted that various supported policy types and the mechanisms surrounding the automation policy discovery and inference is provided infra.

Controller 202 can provide a connection point to various distributed proxy agents 106 in the application security mesh system 200 such that various distributed proxy agents 206 can have security connectivity/channel to controller 202. A connection between controller 202 and distributed proxy agents 206 be provided. The connect can use various secure channel mechanism (e.g. TLS). The connection can also use mutual authentication mechanism (e.g. client certificate(s), etc.) to ensure that only authenticated clients can connect to the authenticated controller. Controller 202 can deploy, un-deploy and monitor various distributed proxy agents 206 in the security mesh system. Controller 202 can send policy information to the distributed proxy agents 206 in a secure manner. Controller 202 can receive telemetry from the distributed proxy agents. Distributed proxy agents 206 collect various type of data about the application and sends it to controller 202. Controller 202 can connect with external services to augment controller's functionality.

For example, controller 202 can connect with an external security service such as threat intelligence, anti-virus, anti-malware, or reputation service etc. that enhances controller's security related functions. Controller 202 can be deployed in various form factors including, inter alia: a software only solution that can be run in either a publicly available computer hosting environment (e.g. a cloud-computing platform) and/or in the customer's environment. Controller 202 can also be deployed as a purpose made hardware appliance or software only appliance in either a publicly available computer hosting environment and/or in the customer's environment. Additionally, controller 202 can be included various software modules, as needed, to achieve the expressed and implicit controller functions.

Adapter 204 can be an intermediary element that is deployed between controller 202 and distributed proxy agent 206. Adapter 204 can be optional is some example embodiments. Adapter 204 is deployed to facilitate connectivity between controller 202 and distributed proxy agent(s) 206. Adapter 204 functionality can include functions, such as, inter alia: the ability to connect out to controller 202 and establish a security channel to controller 202. The connection between adapter 204 and controller 202 can use any appropriate secure transport mechanism (e.g. TLS, etc.). The connection can also use mutual authentication mechanism(s) (e.g. a client certificate, etc.) to ensure that both adapter 204 and controller 206 are mutually authenticated. Adapter 204 can provide a connection point to various distributed proxy agents 206 in the security mesh system. In this way, various distributed proxy agents 206 can have a security connectivity/channel to adapter 204. The connection between adapter 204 and distributed proxy agents 206 uses various secure channel mechanism (e.g. TLS, etc.) and also may use mutual authentication mechanism (e.g. client certificate, etc.) to ensure that authenticated clients can connect to the authenticated controller. Adapter 204 can receive various policies from controller 202 and pass it on to distributed proxy agents 206 with and without modification. Adapter 204 can deploy, un-deploy and monitor various distributed proxy agents 206 in the application security mesh system 200. Adapter 204 can send policy information to the distributed proxy agents 206 in a secure manner. Adapter 204 can receive telemetry from distributed proxy agents 206. Distributed proxy agents 206 collect various type of data about the application and sends it to adapter. Adapter 204 can transmit the received telemetry from agents to controller 202. Adapter 204 may add additional context to the received telemetry before transmitting it to controller. Adapter 204 can connect with external services to augment adapter's functionality. For example, adapter 204 can connect with an external security service (such as, inter alia: threat intelligence, anti-virus, anti-malware, or reputation service etc.) that enhances controller's security related functions. Adapter 204 can be deployed in various form factors including, inter alia, to a software only solution that can be run in either a publicly available computer hosting environment (e.g. a cloud-computing platform) and/or in the customer's environment. Adapter 204 can be deployed as a purpose made hardware appliance or software only appliance in a publicly available computer hosting environment. Adapter 204 can be deployed in the customer's environment.

Distributed proxy agent 206 can be an element that is inserted in a distributed manner to provide a distributed telemetry collection and policy enforcement points. Distributed proxy agent 206 can include an adapter functionality. Distributed proxy agent 206 can have the following functions. Distributed proxy agent 206 can connect out to adapter 204 and establish a security channel to adapter 204. Distributed proxy agent 206 can provide a connection between an agent and adapter 204. Distributed proxy agent 206 can use appropriate secure transport mechanism (e.g. TLS etc.) and/or use mutual authentication mechanism (e.g. client certificate, etc.) to ensure that both agent and adapter are mutually authenticated. Distributed proxy agent 206 can receive various policies from adapter 204. Distributed proxy agent 206 can provide various security functions (e.g. authentication, access control, request/response validation, content inspection and data loss prevention etc.) used to enforce the policies. Distributed proxy agent 206 can capture and process network traffic going in and existing from an application. Distributed proxy agents 206 can collect various type of data about the application and sends it to adapter. Distributed proxy agent 206 can connect with external services to augment agent's functionality. For example, in one instance, distributed proxy agent 206 can connect with an external security service (such as, inter alia: threat intelligence, anti-virus, anti-malware or reputation service etc.) that enhances agent's security related functions. Distributed proxy agent 206 can open one or more than one secure channel to adapter. The number of channels can be determined based on functionality or on some other basis (e.g. performance).

In one example, adapter 204 can be an optional element. According, in an environment when adapter is not deployed, distributed proxy agent 206 can use above capabilities while working with controller directly (e.g. without having an intermediate adapter element). Distributed proxy agent 206 can be deployed in various form factors (e.g. a software only solution that can be run in either a publicly available computer hosting environment and/or in the customer's environment). Distributed proxy agent 206 can also be deployed as a purpose made hardware appliance or software only appliance in either a publicly available computer hosting environment and/or in the customer's environment.

Example Processes

Figure 3:
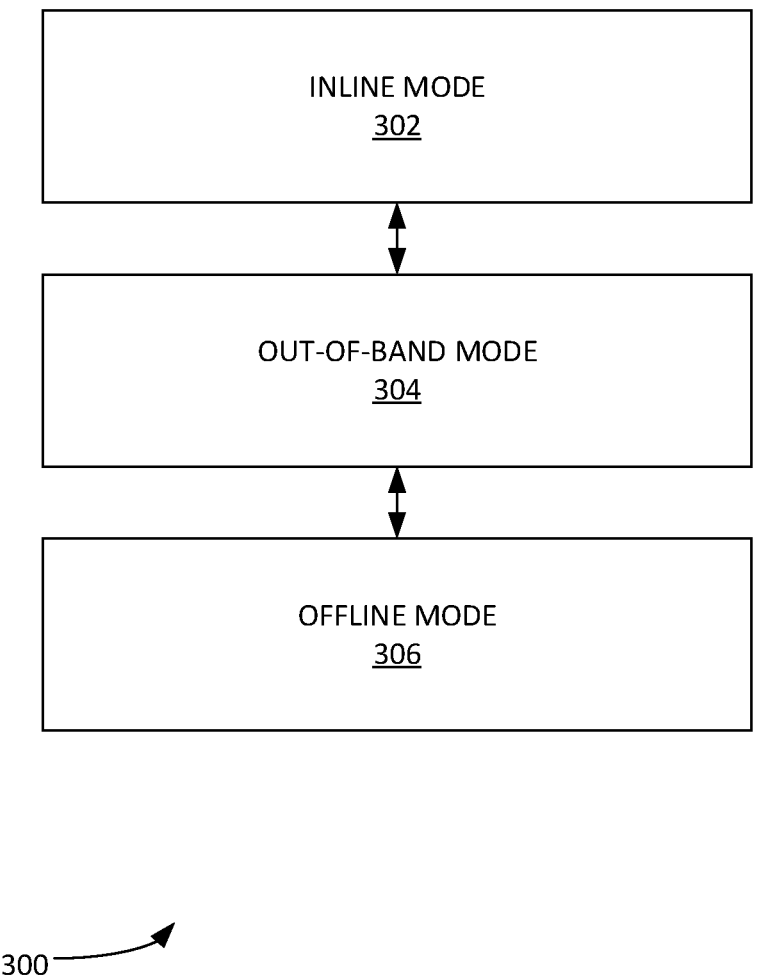
FIG. 3 illustrates an example process for deployment of proxy agent, according to some embodiments.

FIG. 3 illustrates an example process 300 for deployment of a proxy agent, according to some embodiments. Proxy agents (e.g. distributed proxy agent(s) 106) are deployed to provide distributed data/telemetry collection points as well as policy enforcement points throughout the security mesh. Proxy agents can be deployed in many possible topologies as provided in steps 302-306.

In step 302, process 300 can implement inline mode. In inline mode the network traffic received and sent by various applications within a security mesh goes through the proxy agent. In this mode, the proxy agent redirects application traffic to itself. The redirection mechanism may be different for different customer environments. Redirection mechanism may also be different based on different applications.

Example redirection mechanisms are now discussed. These can include programming rules on an existing inline traffic processing device (such as network firewall, host firewall etc.) to redirect the incoming and outgoing traffic to proxy agent. These can include programming rules in an address resolution layer for (e.g. DNS, etc.) such that any client resolving application address obtains an address that is owned by proxy agent. These can include a module that is either tightly coupled or loosely coupled on an existing inline traffic processing device. Inline mode can be used to process both incoming and outgoing traffic or either one of the incoming and outgoing. For inline mode, the proxy agent can be deployed in the same network namespace as of application or may be deployed in a separate namespace. In Inline mode, proxy agent may be deployed in a fully transparent manner such that the incoming and outgoing traffic to application isn't modified. In Inline mode, the proxy agent can be deployed such that it terminates the application connections and/or flow and re-initiates the flows (e.g. as full proxy). An additional example of a process for implementing inline mode is provided in FIG. 11, infra.

In step 304, process 300 can implement an out-of-band mode. In out-of-band mode, the network traffic received and sent by various applications is sent to the proxy agent in an out-of-band manner. In out-of-band mode, the proxy agent obtains a copy of the incoming and outgoing traffic and processes a copy.

When operating in out-of-band mode the following steps can be implemented. The proxy agent can be deployed in the same network namespace as the application and can be capturing the network traffic in real-time. The proxy agent can be deployed in a different network namespace and can obtain the packet from another device that captures. The network traffic can be replayed to the proxy agent. In out-of-band mode, proxy agent does not change the incoming and outgoing application traffic. Out-of-band mode can be used to process both incoming and outgoing traffic or either one of the incoming and outgoing. An additional example of a process for implementing out-of-band mode is provided in FIG. 12, infra.

In step 306, process 300 can implement an offline mode. In offline mode, the proxy agent operates on a network traffic that has been captured before and now is being replayed to the proxy agent. The captured network traffic can be stored as a data file. The other variation of this offline mode is that proxy agent may be operating from log files. In a given deployment, multiple proxy agents can be deployed such that they are operating in different modes. Additionally, it is noted that for a single proxy agent, it is possible that the complete network traffic for an application can be split to be processed in different modes.

Figure 4:
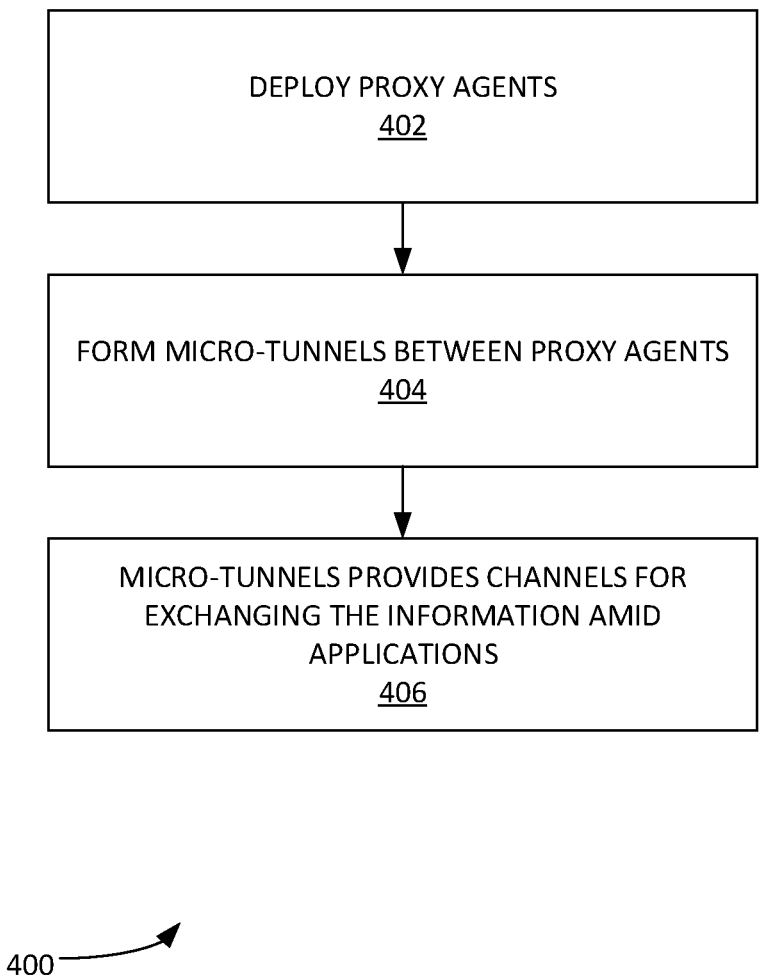
FIG. 4 illustrates an example process for on-demand micro tunnels between proxy agents, according to some embodiments.

FIG. 4 illustrates an example process 400 for on-demand micro tunnels between proxy agents, according to some embodiments. In step 402, proxy agent(s) are deployed. In step 404, process 400 forms micro tunnels between said proxy agents. Micro tunnels are created dynamically. Micro tunnels are created on-demand as and when the data needs to be transferred between the proxy agents based on various events.

Example events are now discussed. An event can include when an application behind a specific proxy agent is making a request to another application behind another proxy-agent. An event can include when both proxy agents involved form a tunnel between them and transfer application payload over the tunnel. An event can include when a proxy agent is trying to discover and exchange other proxy agents in the environment. An event can include when a proxy agent initiates the tunnel to the other proxy agents to discover.

In step 406, the micro tunnels provide channels for exchanging the information amid applications. The micro tunnels can provide functions. The micro tunnels can provide security add-ons (e.g. encryption, authentication/authorization, etc.). The micro tunnels can provide acceleration functions (e.g. compression, multiplexing of messages, etc.).

Figure 5:
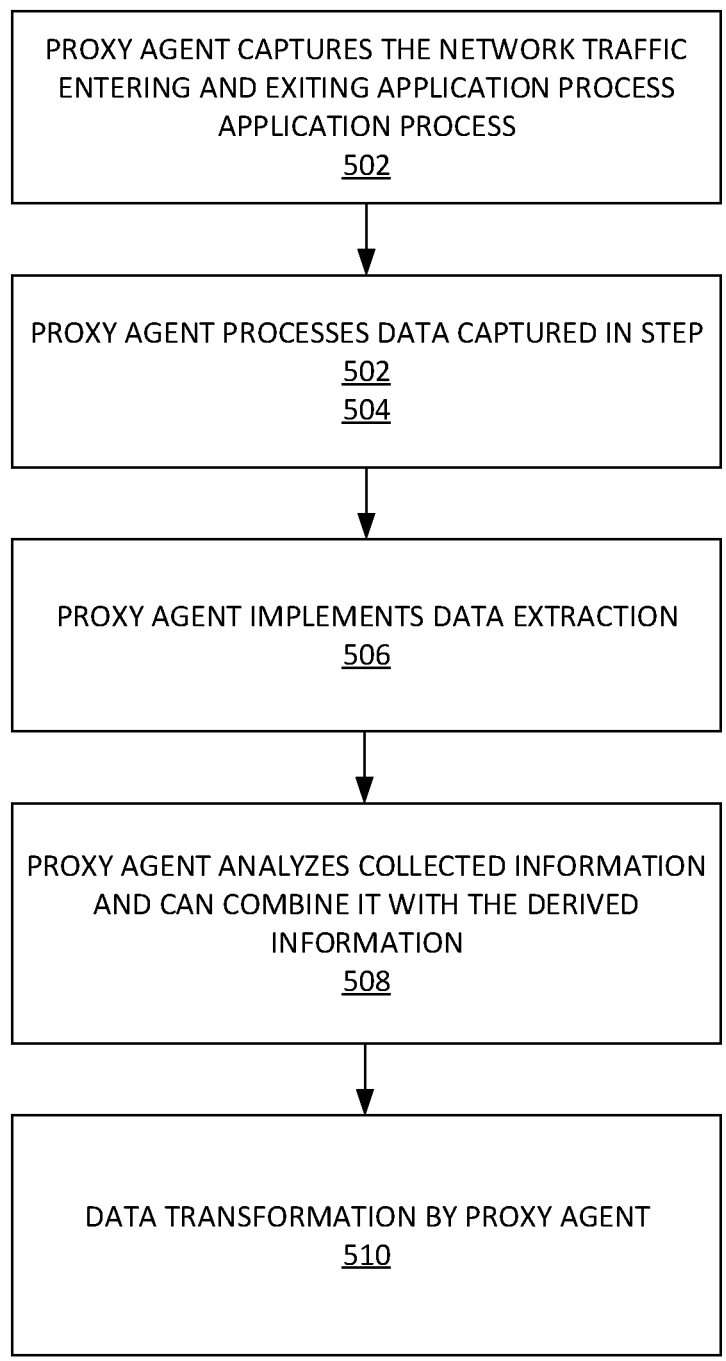
FIG. 5 illustrates an example process for data collection by the proxy agent, according to some embodiments.

FIG. 5 illustrates an example process 500 for data collection by the proxy agent, according to some embodiments. In step 502, the proxy agent captures the network traffic entering and exiting application process application process. In step 504, the proxy agent processes the network traffic entering and exiting application process application process.

The proxy agent can capture and process the network traffic using various methods as follows. A method can include being inline in the path of network traffic such that any networking packet can only reach to the application after it goes-through and can be processed by proxy agent. A method can include being inline in the path of network traffic such that any networking packet exiting the application goes-through and can be processed by proxy agent before it can make its way to final destination. A method can include being a tap in the path of network traffic such that any networking packet going to application is copied out to the proxy agent without impacting the original packet that is going to the application. The proxy agent processes the copied packet. A method can include being a tap in the path of network traffic such that any networking packet exiting out of the application is copied out to the proxy agent. The proxy agent processes the copied packet. A method can include working in conjunction with another networking element (e.g. proxy or gateway) that may be capturing and processing and the networking traffic entering and exiting the application in in-line or in as a tap. The proxy agent can integrate with another networking element such that it can capture and process the network traffic entering and exiting the application. A method can include using a stored copy of network traffic that was captured independently and then was provided to proxy agent as input in form of a data file or is replayed to proxy agent by a network traffic replay tool. A method can include using any other source that can describe the input and output traffic for an application (e.g.

a log file in one instance that has logs captured from the application and has information on input and output traffic to the application).

In step 506, process 500 implements data extraction by the proxy agent. The proxy agent processes the input network traffic and extracts various information from the received network packet. This information can vary depending on the structure of the packet can may be different for different networking protocols.

For example, when a proxy agent is processing an HTTP protocol packet, it can collect following information. Identity attributes can be collected. Identity attributes can include, inter alia: IP address, name, domain name for the originating entity, etc. The originating entity can be a user, a computer process or some other entity capable of sending a networking packet to another compute process. Identity attributes can include an input message/HTTP Request attributes (e.g. API URL, URL parameters, request headers (including cookies), etc.). Identity attributes can include input message/HTTP Request payload content (e.g. the content of the request body, etc.). Identity attributes can include an output response/HTTP Response attributes (e.g. the response headers (including cookies)). Identity attributes can include output response/HTTP Response payload content (e.g. the content of the request body, etc.). Identity attributes can include HTTPS certificate information (e.g. the common name and expiration date of the certificate, etc.). For other application specific protocols (e.g. MySQL, DB, Mongo, Redis, Memcached or Kafka etc. or for future protocols, etc.) the proxy agent can capture the information that is relevant to provide security context in the domain of the corresponding protocol.

In step 508, the proxy agent analyzes the collected information and can combine it with the derived information that is derived from the processing of the packet by the proxy agent. The derived information can vary depending on the structure of the packet and can be different for different networking protocols.

In one example, when proxy agent is processing HTTP protocol packet, it can derive information include the following. It can derive the size of the request and response headers and payload. It can derive the rate of the request and response. It can derive the success and failure responses of the headers and payload. In addition, the proxy agent can derive information that may be represent structural information about the information encapsulated within the network packet. For example, for HTTP protocol, the proxy agent derives information about API request and response schema that provides structural representation of the API call. For other protocols (e.g. MySQL, Db, Mongo Db, Redis, Memcached or Kafka etc.) the proxy agent can derive structural representation as is available and suitable in the area of respective protocol.

In step 510, process 500 can implement data transformation by proxy agent. The proxy agents applies various transformation function to the collected information and converts the extracted data to a meta data. Metadata can be a set of attributes described as key-value pair. These key value pairs describes various attributes of the network traffic that is being captured and processed by proxy agent. For example, with HTTP protocol network traffic, the metadata can include the following. The metadata can include a set of attributes that describes the information about the request response headers. The metadata can include a set of attributes that describes the security related information about the content that are present in the request and response payload. The metadata can include a set of attributes that describes the performance related information (e.g. response time, total throughput, success/failures) about the network traffic. The metadata can include a set of attributes that describes the policy related information (e.g. whether network traffic matched a specific policy). The metadata can include a set of attributes that describes the structural information (e.g. derived schema, etc.). The metadata can include a set of environmental attributes about the network traffic (e.g. the attributes of the source and destination for the network traffic, etc.).

The proxy agent transfers the metadata to the controller and/or the intermediate adapter. The transfer of meta-data can be in real time and/or can be buffered and transferred as batch for optimization.

Figure 6:
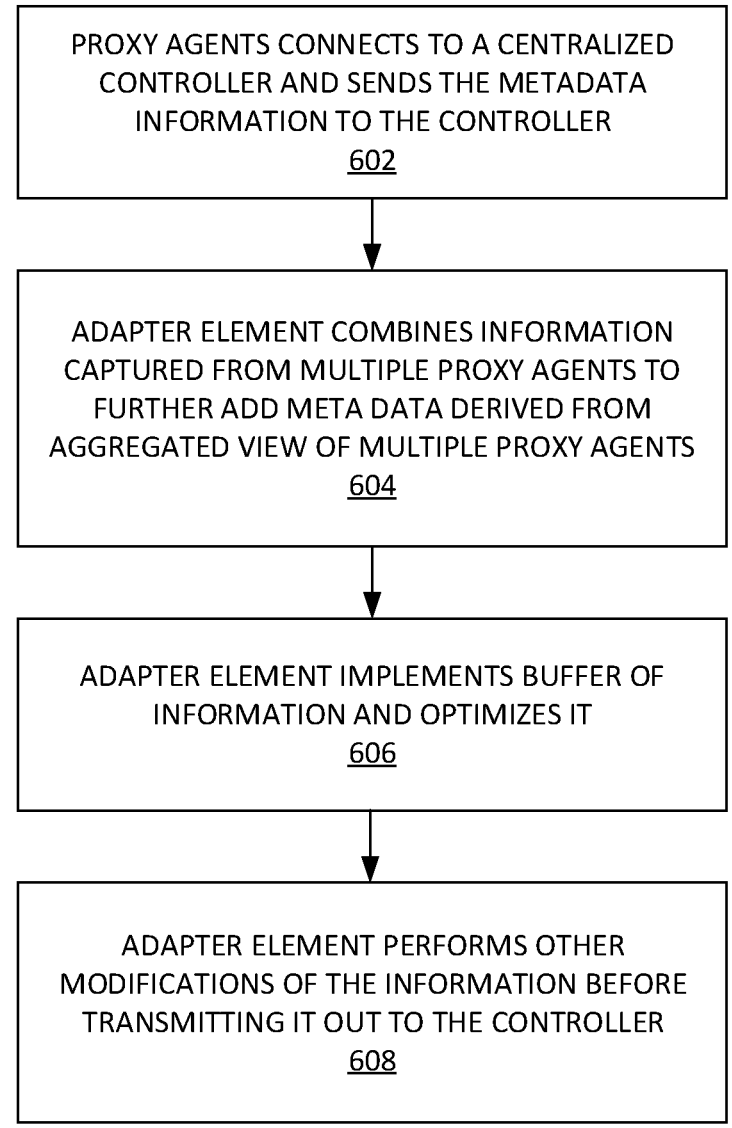
FIG. 6 illustrates an example process for data aggregation and enrichment in adapter, according to some embodiments.

FIG. 6 illustrates an example process 600 for data aggregation and enrichment in adapter, according to some embodiments. In step 602, proxy agents connect to a centralized controller and sends the metadata information to the controller. Information transfer can be done through an intermediate adapter element. In step 604, the adapter element combines the information captured from multiple proxy agents to further add meta data derived from aggregated view of multiple proxy agents. In step 606, the adapter element implements a buffer of the information. Adapter element optimize it by combining it to a compressed form before transmitting. In step 608, the adapter element may also perform other modification of the information before transmitting it out to the controller as needed. For example, the adapter can obfuscate some part of information to further increase the privacy of the meta data.

Figure 7:
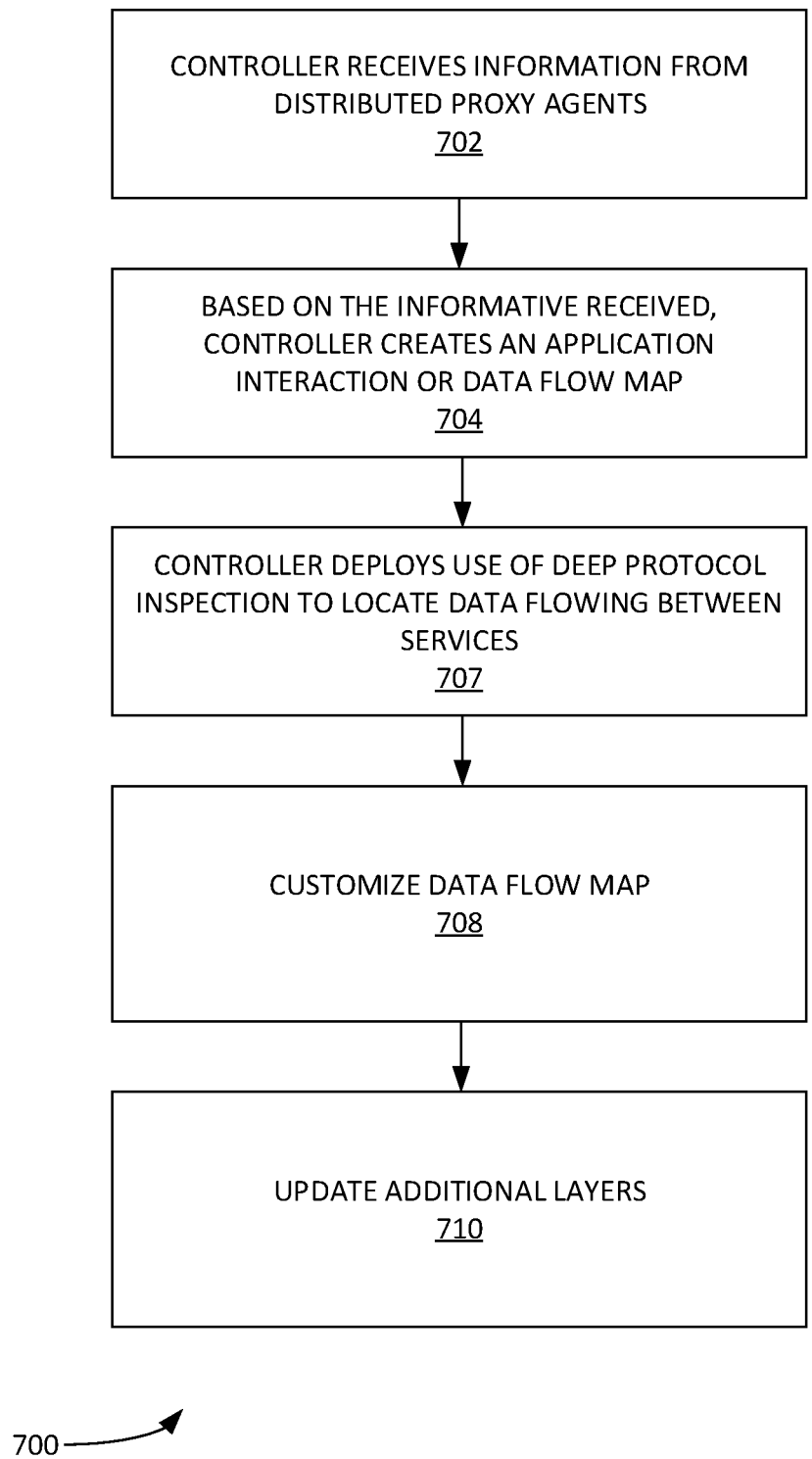
FIG. 7 illustrates an example process for implementing a customizable multi-layered application data flow map at controller, according to some embodiments.

FIG. 7 illustrates an example process 700 for implementing a customizable multi-layered application data flow map at controller, according to some embodiments. Process 700 can provide a customizable multi-layered application data flow map at controller. In step 702, controller (e.g. controller 102) receives information from distributed proxy agents (e.g. via proxy adapters). In step 704, based on the informative received, the controller creates an application interaction or data flow map. The application interaction map provides insight into how the various services are interacting with each other. The application interaction map can provide information that includes the following. For a given service, application interaction map can provide which are the other services that are making request to the selected service (e.g. which other services are receiving data from the selected service). For a given service, application interaction map can provide which are the other services that this service is making request to (e.g. which other services are sending the data to the selected service).

In step 706, process 700 controller deploys the use of metadata information received from distributed proxy agents that uses deep protocol inspection to find the data flowing between services and creates a data flow map. For example, for a Kafka protocol, the controller can look inside the information that is related to Kafka message exchanges to determine the how the data is flowing among services using Kafka protocol. Or for HTTP/TLS protocol, the controller can look inside the HTTP request/response metadata received from distributed proxy agents to create. The data map provides insight into how the various services are exchanging information with each other. The data flow map can provide information that includes the following. For a given service, data flow map can provide what kind of data is being received and sent from the service. This data type may be of interest for various purposes including, but not limited to, compliance and data loss prevention purpose.

Data flow map can provide insight on if the services are exchanging the sensitive information.

The application and data flow map is customizable in step 708. User of the application and data flow map can specify various criteria to only show data flows that meets a specific criteria. Criteria are specified as regular expressions of various attributes. The controller can support various attributes that are available for customizing data flow maps. These can include metadata about the services (e.g. name of the service or an attribute that is a configured attribute for the service, etc.). These can include derived security related information about the services (e.g. services that are exchanging sensitive information, services that are experiencing high amount of authentication failures etc.). These can include derived performance related information about the services. These can include derived source and destination related information for the source and destination of the service. The user specifies regular expression-based criteria that consists of one of more than one attribute. The controller can render a data flow map that provides the flows that are matching with the specified criteria.

The application and data flow map can be a multi-layer map. Each layers present a set of related information and analytics for the admin's consumption. These layers can include, inter alia: a network traffic layer; a security layer; a performance layer; a policy layer; etc. Once a base layer has been customized, it causes other layers to update accordingly. In step 710, each layer can be customized to have data based on the specified criteria.

Figure 8:
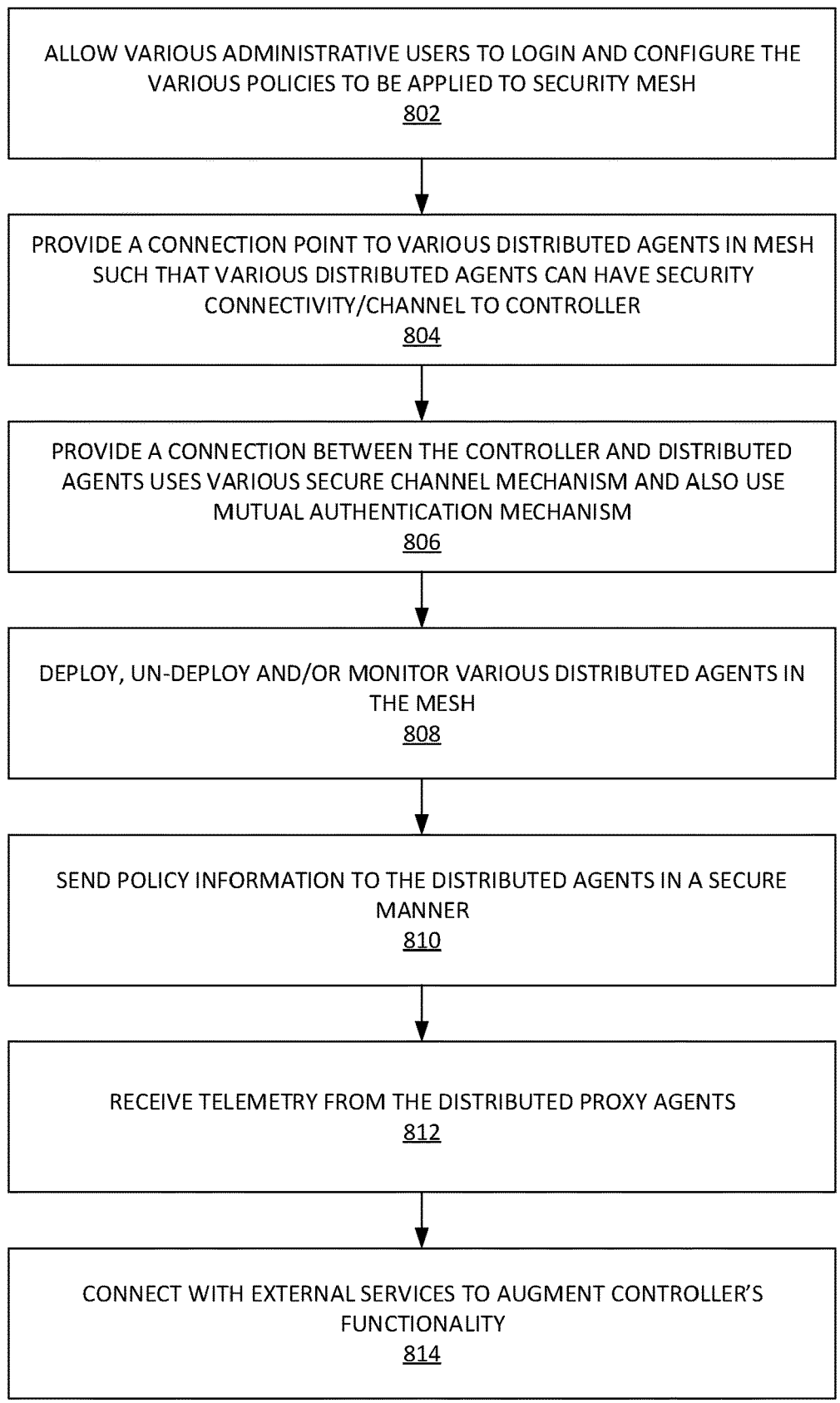
FIG. 8 illustrates an example process for implementing a centralized controller functionality, according to some embodiments.

FIG. 8 illustrates an example process 800 for implementing a centralized controller functionality, according to some embodiments. An example of a centralized controller functionality is provided in FIGS. 1 and 2 supra. Centralized controller functionality can implement the following steps. In step 802, process 800 can allow various administrative users to login and configure the various policies to be applied to security mesh. This can include, inter alia: various supported policy types and the mechanisms surrounding the automation policy discovery and inference is described later in this document. In step 804, process 800 provide a connection point to various distributed proxy agents in the security mesh such that various distributed proxy agents can have security connectivity/channel to the controller.

In step 806, process 800 can provide a connection between the controller and distributed proxy agents uses various secure channel mechanism (e.g. TLS, etc.) and also uses mutual authentication mechanism (e.g. client certificate). Step 806 can be used to ensure that only authenticated clients can connect to the authenticated controller.

In step 808, process 800 can deploy, un-deploy and/or monitor various distributed proxy agents in the security mesh. In step 810, process 800 can send policy information to the distributed proxy agents in a secure manner.

In step 812, process 800 can receive telemetry from the distributed proxy agents. For example, distributed proxy agents collect various type of data about the application and sends it to controller. The details of various type of data and the mechanism of transfer are provided herein.

In step 814, process 800 can connect with external services to augment controller's functionality. In one example, the controller can connect with an external security service such as threat intelligence, anti-virus, anti-malware or reputation service etc. that enhances controller's security related functions.

Figure 9A:
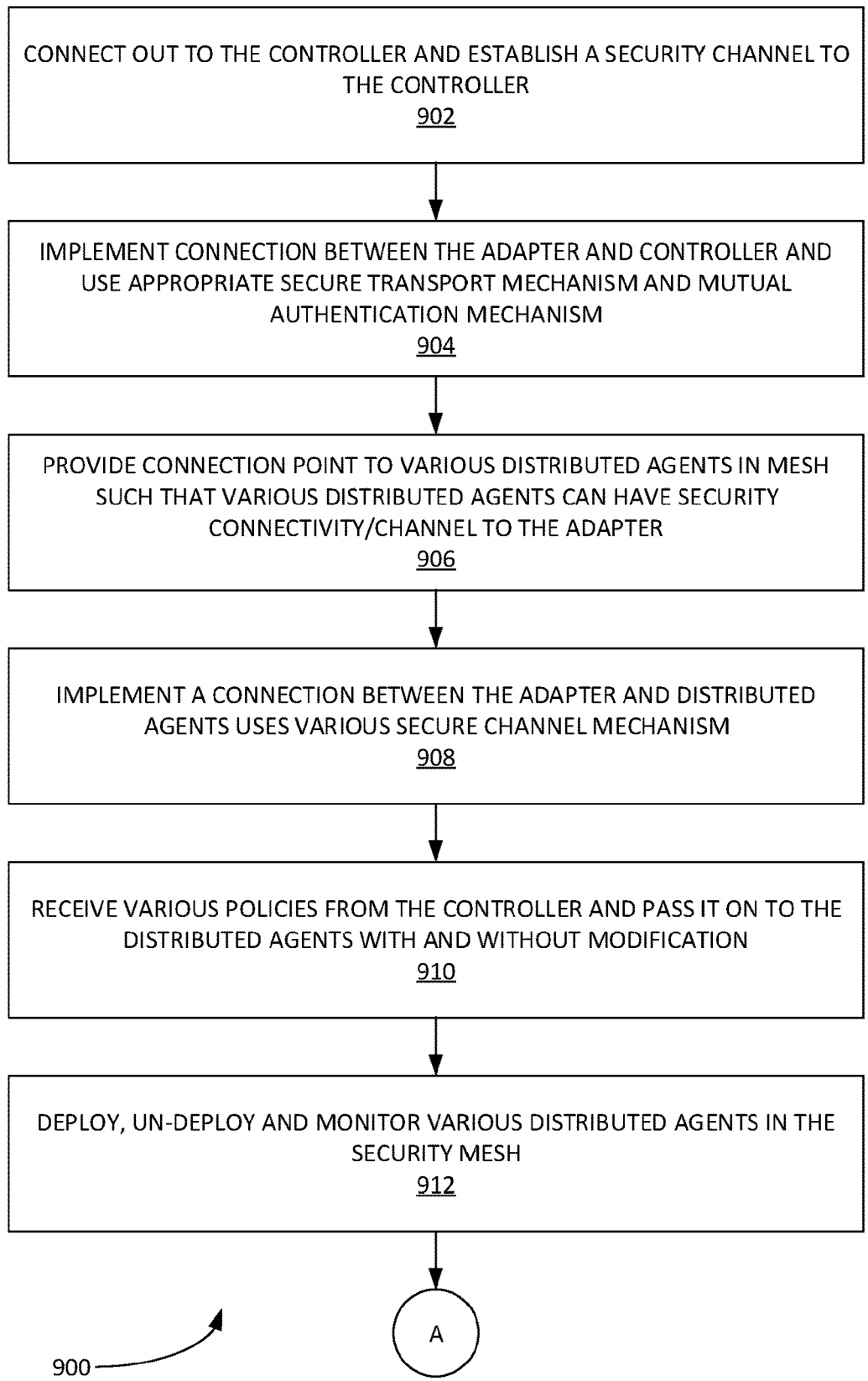
FIGS. 9A and 9B illustrate an example process for implementing an adapter, according to some embodiments.

FIG. 9A illustrates an example process 900 for implementing an adapter, according to some embodiments. Adapter functionality can be implemented by adapters 104/204 supra. In step 902, process 900 can to connect out to the controller and establish a security channel to the controller.

In step 904, process 900 can implement a connection between the adapter and the controller This can use appropriate secure transport mechanism (e.g. TLS, etc.) and/or a mutual authentication mechanism (e.g. client certificate) to ensure that both adapter and controller are mutually authenticated. In step 906, process 900 can provide a connection point to various distributed proxy agents in the security mesh such that various distributed proxy agents can have security connectivity/channel to the adapter.

In step 908, process 900 can implement a connection between the adapter and distributed proxy agents uses various secure channel mechanism (e.g. TLS). Step 908 can also use mutual authentication mechanism (e.g. client certificate) to ensure that only authenticated clients can connect to the authenticated controller.

In step 910, process 900 can receive various policies from the controller and pass it on to the distributed proxy agents with and without modification. It is noted that various supported policy types and the mechanisms surrounding the automation policy discovery and inference are provided herein.

Figure 9B:
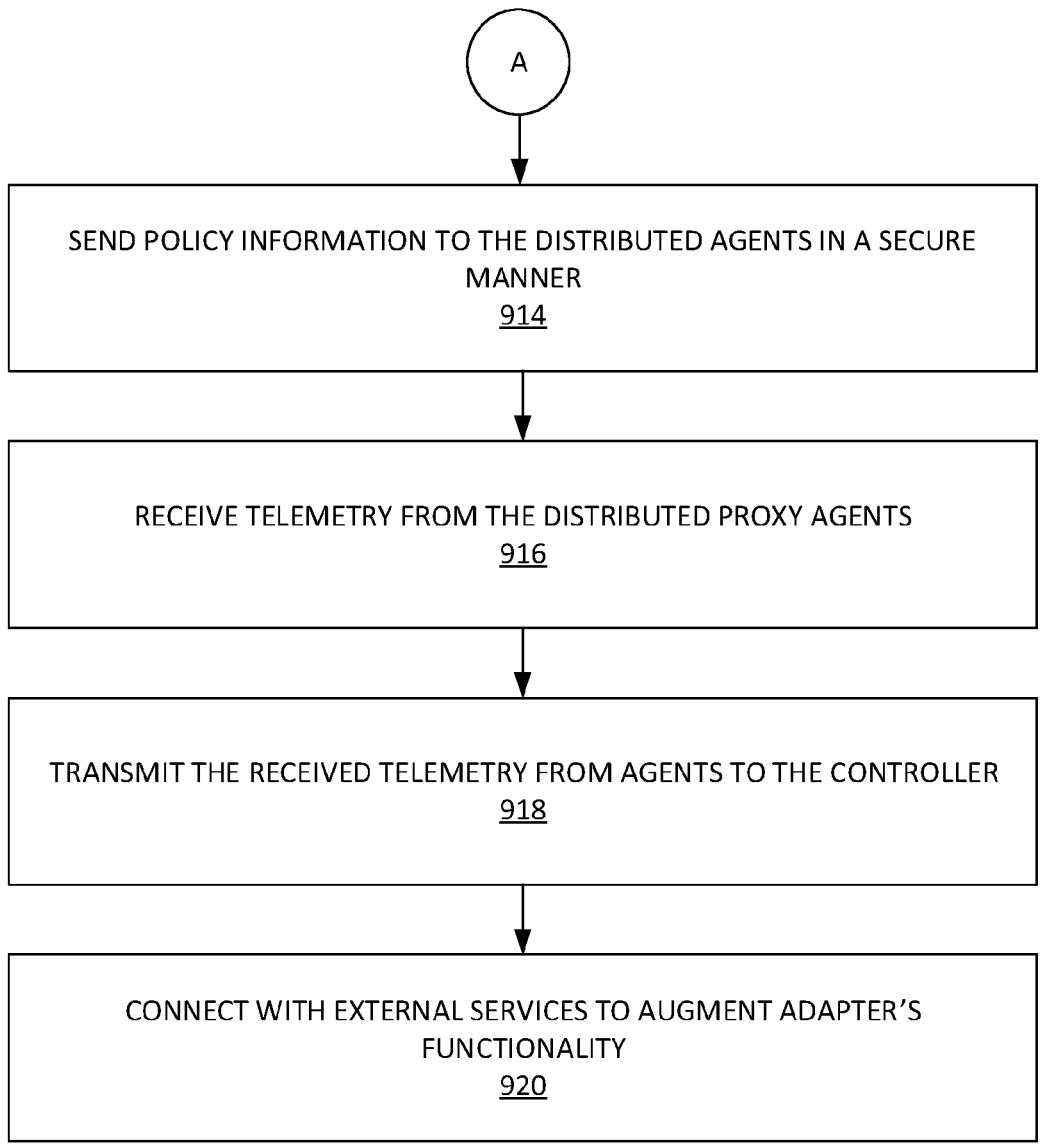

In step 912, process 900 can deploy, un-deploy and monitor various distributed proxy agents in the security mesh. Turning now to FIG. 9B, in step 914, process 900 can send policy information to the distributed proxy agents in a secure manner. In step 916, process 900 can receive telemetry from the distributed proxy agents. Distributed proxy agents can collect various type of data about the application and sends it to adapter.

In step 918, process 900 can transmit the received telemetry from agents to the controller. For example, the adapter can add additional context to the received telemetry before transmitting it to controller.

In step 920, process 900 can connect with external services to augment adapter's functionality. For example, the adapter can connect with an external security service such as threat intelligence, anti-virus, anti-malware or reputation service etc. that enhances controller's security related functions.

Figure 10:
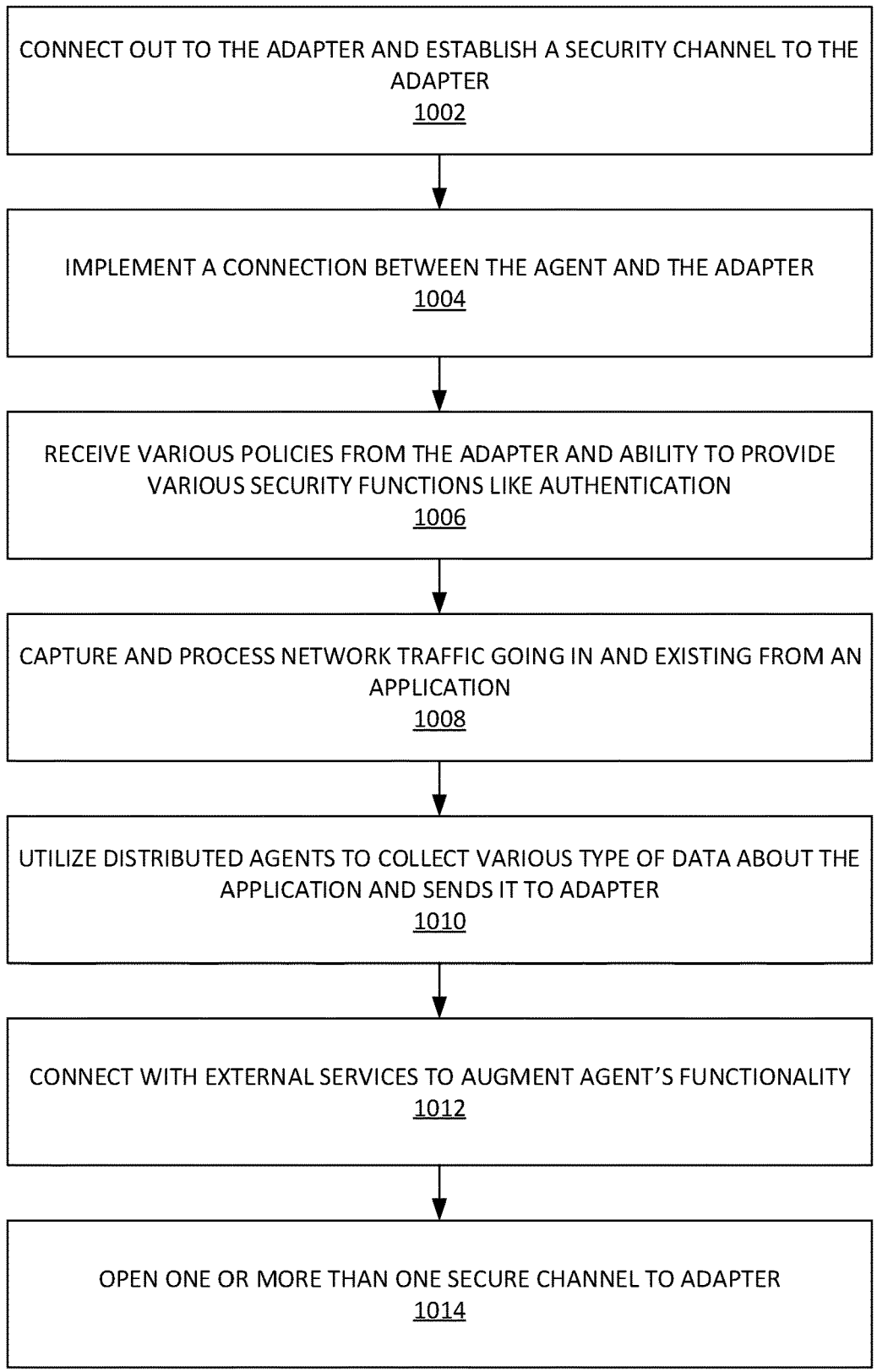
FIG. 10 for implementing a distributed proxy agent, according to some embodiments.

FIG. 10 for implementing a distributed proxy agent, according to some embodiments. The distributed proxy agent of process 1000 can be distributed proxy agent 206. In step 1002, process 1000 can connect out to the adapter and establish a security channel to the adapter. In step 1004, process 1000 can implement a connection between the distributed proxy agent and the adapter. This can use an appropriate secure transport mechanism (e.g. TLS) and/or a mutual authentication mechanism (e.g. client certificate) to ensure that both agent and adapter are mutually authenticated.

In step 1006, process 1000 can receive various policies from the adapter and ability to provide various security functions like authentication, access control, request/response validation, content inspection and data loss prevention etc. needed to enforce the policies.

In step 1008, process 1000 can capture and process network traffic going in and existing from an application. The mechanism for capturing and processing network traffic is described further in this document.

In step 1010, process 1000 can utilize distributed proxy agents to collect various type of data about the application and sends it to adapter.

In step 1012, process 1000 can connect with external services to augment agent's functionality. For example, a distributed proxy agent can connect with an external security service such as threat intelligence, anti-virus, anti-malware or reputation service etc. that enhances agent's security related functions.

In step 1014, process 1000 can open one or more than one secure channel to adapter. The number of channels can be determined based on functionality or on some other basis (e.g. performance, etc.).

As noted supra, various different modes of traffic redirection to a proxy agent can be employed. Various processes of these modes of traffic redirection are now discussed.

Figure 11:
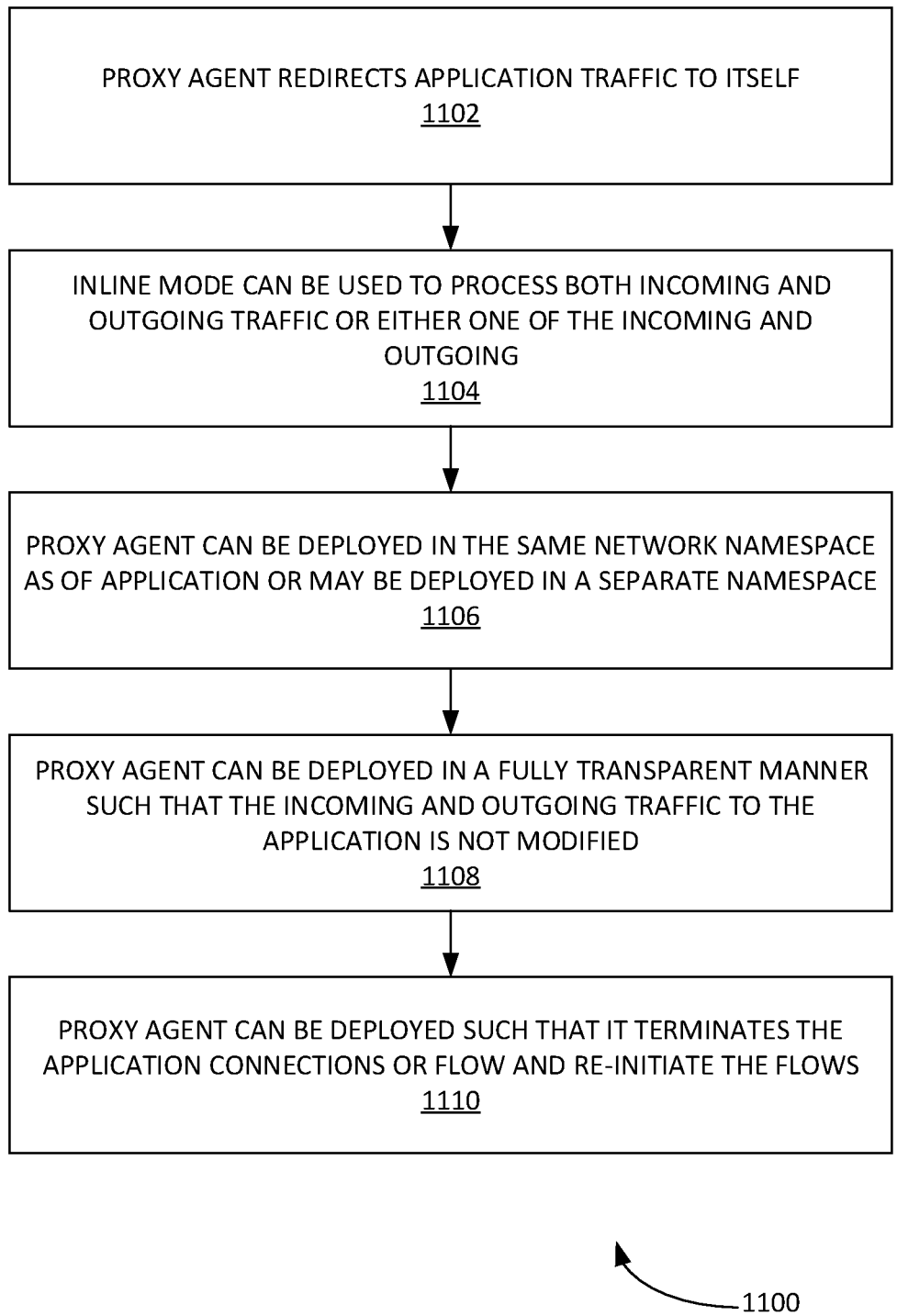
FIG. 11 illustrates an example process for implementing network traffic redirection to proxy agents in an inline mode, according to some embodiments.

FIG. 11 illustrates an example process 1100 for implementing network traffic redirection to proxy agents in an inline mode, according to some embodiments. In an inline mode, the network traffic received and sent by various applications passes through the proxy agent. Process 1100 can be used in lieu of and/or in combination with step 302 discussed supra.

In step 1102, the proxy agent redirects application traffic to itself. The redirection mechanism can vary for different customer environments. Redirection mechanism can also be different based on different applications. Example redirection mechanisms can include, inter alia:

Programming rules on an existing inline traffic processing device such as network firewall, host firewall, etc. to redirect the incoming and outgoing traffic to the proxy agent;

Programming rules in an address resolution layer for example DNS, such that any client resolving application address receives an address that is owned by the proxy agent;

By being a module that is either tightly coupled or loosely coupled on an existing inline traffic processing device such as reverse proxy or web server; and by being a module that is either tightly coupled or loosely coupled within the application itself.

In step 1104, the inline mode can be used to process both incoming and outgoing traffic or either one of the incoming and outgoing. In step 1106, a proxy agent can be deployed in the same network namespace as of application and/or may be deployed in a separate namespace. In step 1108, the proxy agent can be deployed in a fully transparent manner such that the incoming and outgoing traffic to the application is not modified. In step 1110, a proxy agent can be deployed such that it terminates the application connections or flow and re-initiate the flows (e.g. also referred to as full proxy).

Figure 12:
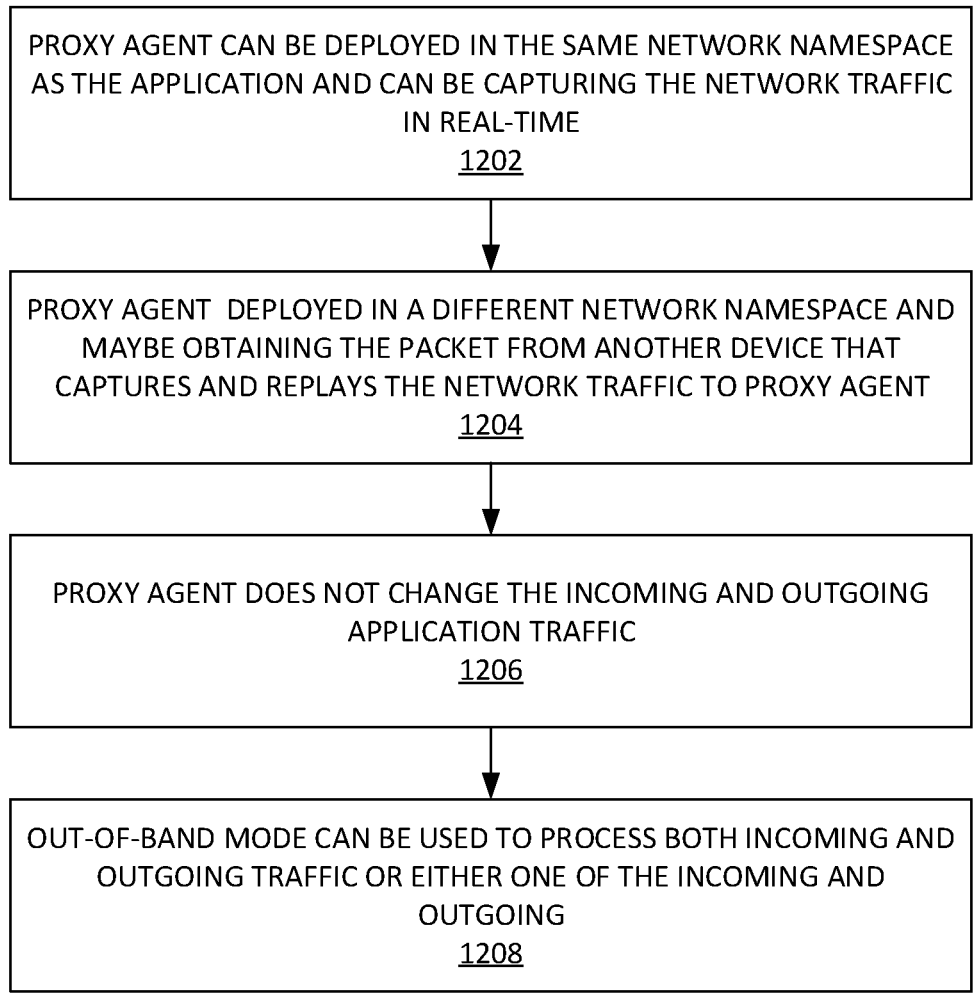
FIG. 12 illustrates an example process for implementing an out-of-band mode, according to some embodiments.

FIG. 12 illustrates an example process 1200 for implementing an out-of-band mode, according to some embodiments. Process 1200 can be implemented such that the network traffic received and sent by various applications is sent to a proxy agent in an out-of-band manner. Process 1200 can be used in lieu of and/or to supplement step 304 discussed supra. In the out-of-band, the proxy agent obtains a copy of the incoming and outgoing traffic and processes a copy.

In step 1202, when operating in out-of-band mode, the proxy agent can be deployed in the same network namespace as the application and can be capturing the network traffic in real-time.

In step 1204, the proxy agent can be deployed in a different network namespace and maybe obtaining the packet from another device that captures and replays the network traffic to the proxy agent. In step 1206, the proxy agent does not change the incoming and outgoing application traffic. In step 1208, the out-of-band mode can be used to process both incoming and outgoing traffic or either one of the incoming and outgoing.

Figure 13:
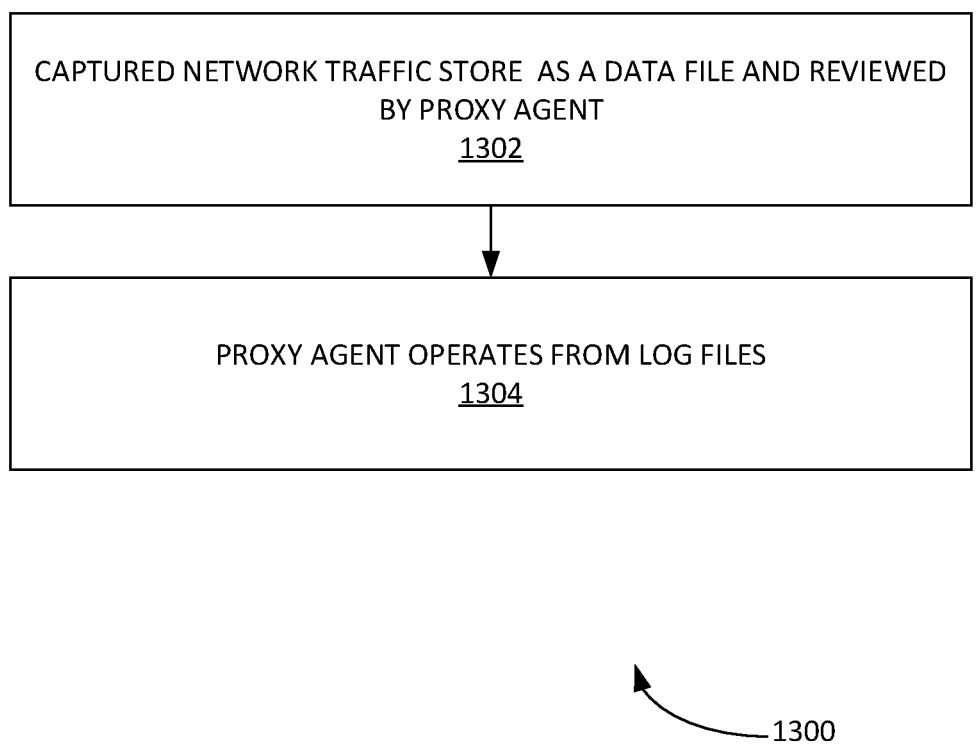
FIG. 13 illustrates an example process for implementing an Offline Mode, according to some embodiments.

FIG. 13 illustrates an example process 1300 for implementing an Offline Mode, according to some embodiments. Process 1300 can be implemented such that proxy agent operates on network traffic that has been captured before and now is being replayed to the proxy agent. In step 1302, the captured network traffic can be stored as a data file. In another example embodiment, the proxy agent can be operating from log files in step 1304.

It is noted that, given deployment, multiple proxy agents can be deployed such that various subsets of proxy agents are operating in different modes. Additionally, for a single proxy agent, it is possible that the complete network traffic for an application is split to be processed in different modes. These attributes can also be applied to process 300 supra.

Figure 14:
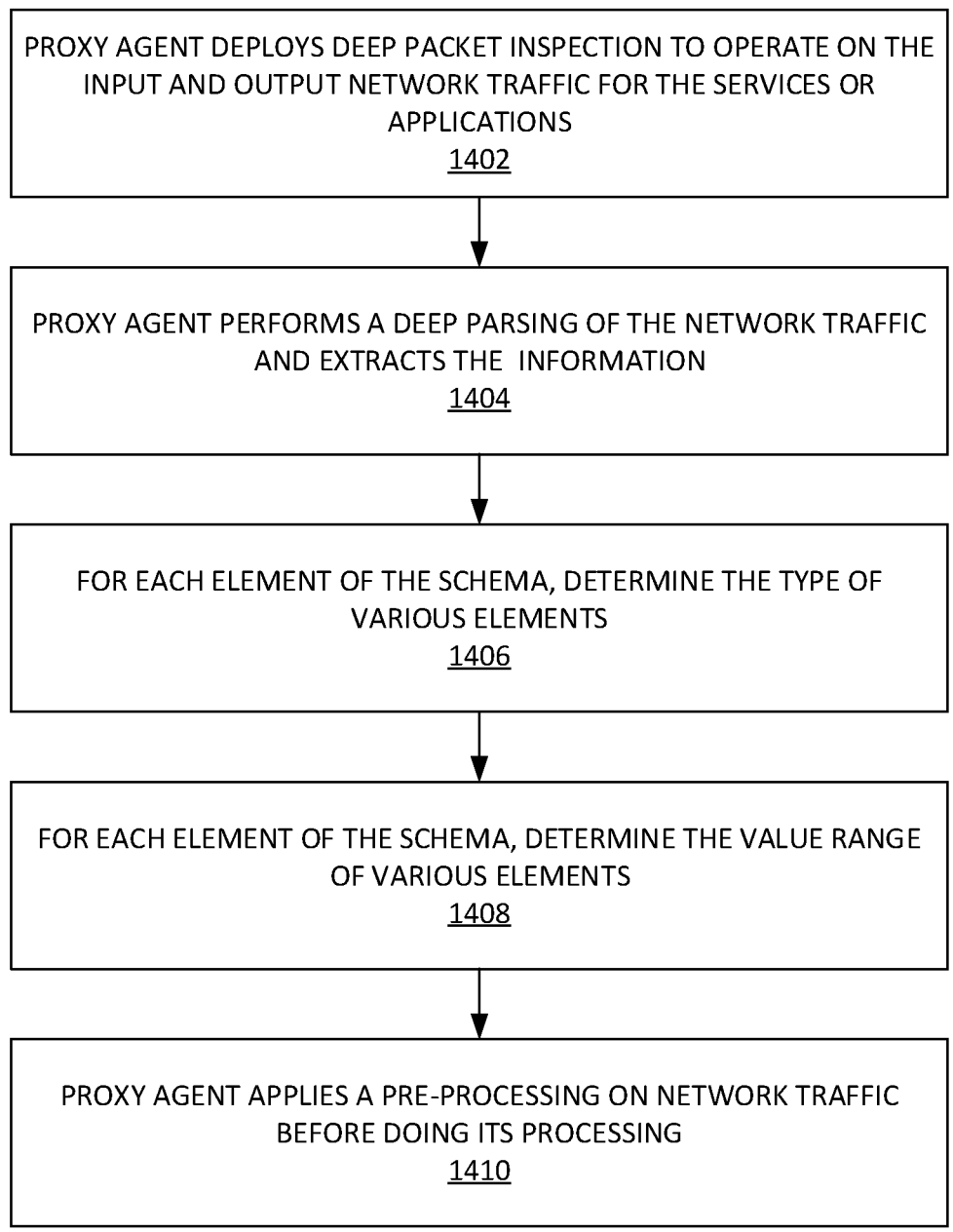
FIG. 14 illustrates an example process for implementing an information/schema derivation from network traffic, according to some embodiments.

FIG. 14 illustrates an example process 1400 for implementing an information/schema derivation from network traffic, according to some embodiments. In step 1402, the proxy agent deploys the use of deep packet inspection to operate on the input and output network traffic for the services or applications that are being protected by the proxy agent. In step 1404, the proxy agent performs a deep parsing of the network traffic and extracts the information. Example extracted information includes, inter alia: information about active services; URL of the API (e.g. the API endpoint); type of the API (e.g. JSON, XML, GRPC, etc.); schema of the API; etc. It is noted that the schema of the API can define the structure of the information carried in API's payload, headers or URLs. In step 1406, for each element of the schema, process 1400 determine the type of various elements (e.g. string, int, object, array, etc.). In step 1408, for each element of the schema, process 1400 determines the value range of various elements.

It is noted that the information extracted may further depend and may be different for a different type of applications or APIs. For example, for a GRPC API, the proxy agent can learn the GRPC method as part of schema derivation. In step 1410, the proxy agent can apply a pre-processing on network traffic before doing its processing. For example, if the network traffic encrypted, the proxy agent can decrypt the traffic. If network traffic is encoded or compressed, the proxy agent can decode or decompress network traffic.

Figure 15:
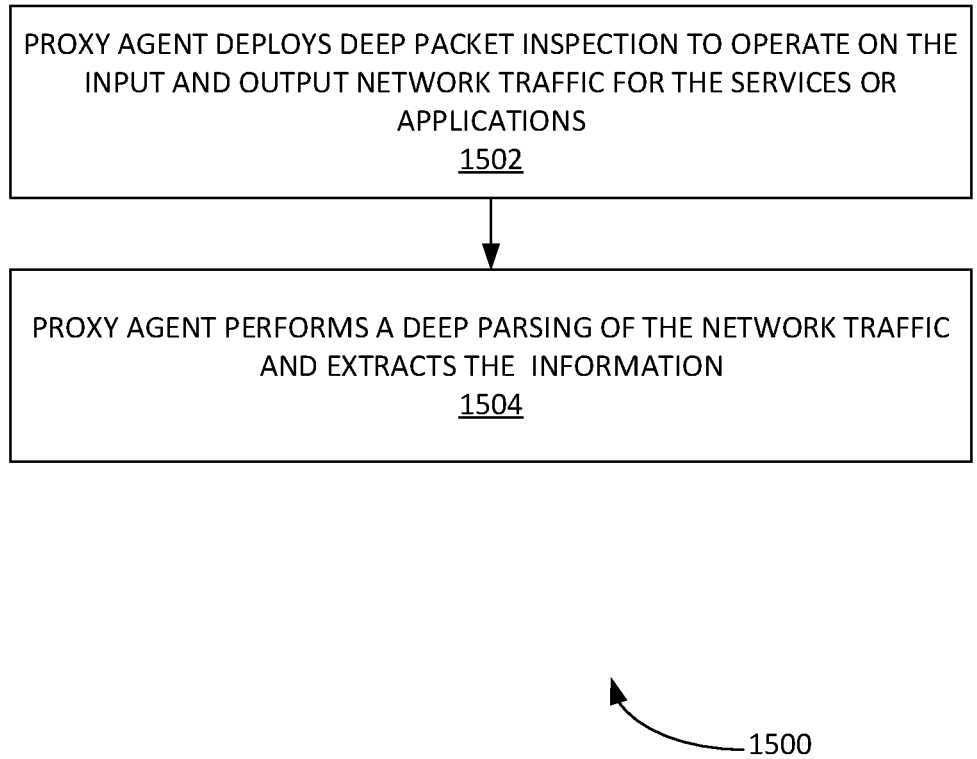
FIG. 15 illustrates a process for implementing a streaming and buffering mode of a proxy agent, according to some embodiments.

FIG. 15 illustrates a process 1500 for implementing a streaming and buffering mode of a proxy agent, according to some embodiments. In step 1502, the proxy agent can process network traffic in either packet-by-packet basis (e.g. streaming mode). This can be done such that each packet provides a part of the information to the proxy agent. The proxy agent compiles the information gradually.

Alternatively, in step 1504, the proxy agent can process network traffic such that it operates on the transaction level. The proxy agent first processes the packets to determine the start and end of the transaction. Then for the duration of the transaction, the proxy agent buffers the network traffic and processes it by processing the whole buffer at once.

Figure 16:
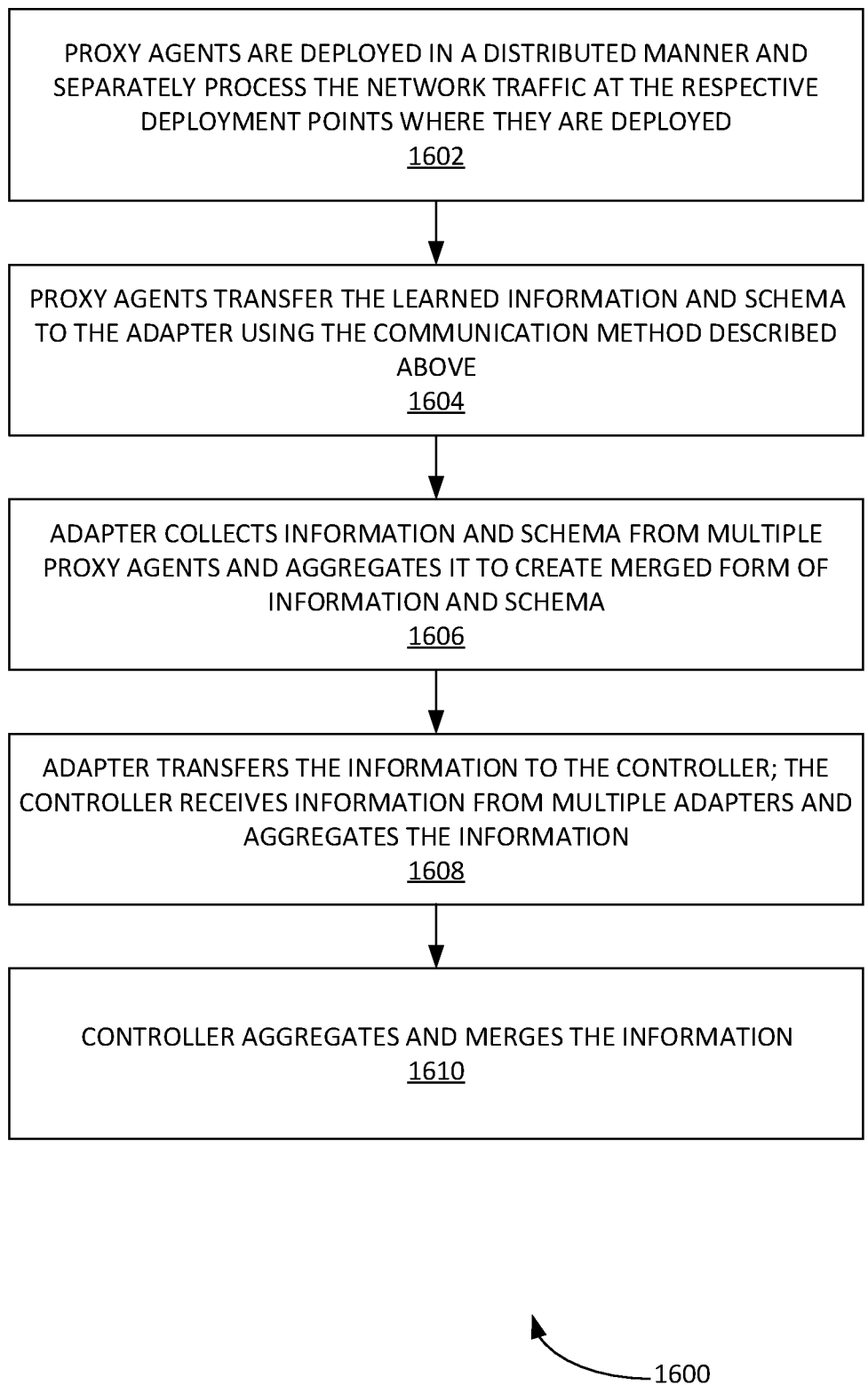
FIG. 16 illustrates an example process for aggregation of learned Information and schema from distributed proxy agents at a controller and an adapter, according to some embodiments.

FIG. 16 illustrates an example process 1600 for aggregation of learned Information and schema from distributed proxy agents at a controller and an adapter, according to some embodiments. In step 1602, proxy agents are deployed in a distributed manner and separately process the network traffic at the respective deployment points where they are deployed. In step 1604, the proxy agents transfer the learned information and schema to the adapter using the communication method described above. In step 1606, the adapter collects the information and schema from multiple proxy agents and can aggregate it to create a merged form of the information and schema. The merging of the information can be semantical and can include, inter alia: deduplication of the URL endpoints to combine them into a single URL endpoint; deduplication of the query parameters to combine them into a single query parameter; deduplication of the header parameters to combine them into a single header parameter; deduplication of the schema elements from the payload to combine them into a single payload parameter; etc.

It is noted that aggregating the information and schema can result in changing the learned type and properties and attributes of the various parameters based on an aggregated view of the information/schema received.

In step 1608, the adapter, in turn, transfers the information to the controller. The controller receives information from multiple adapters and aggregates the information. In step 1610, the controller aggregates and merges of the information. In this step, the controller performs similar functions as implemented by adapter. The controller may perform following functions including, inter alia: deduplication of the URL endpoints to combine them into a single URL endpoint; deduplication of the query parameters to combine them into a single query parameter; deduplication of the header parameters to combine them into a single header parameter; deduplication of the schema elements from the payload to combine them into a single payload parameter; etc.

Figure 17:
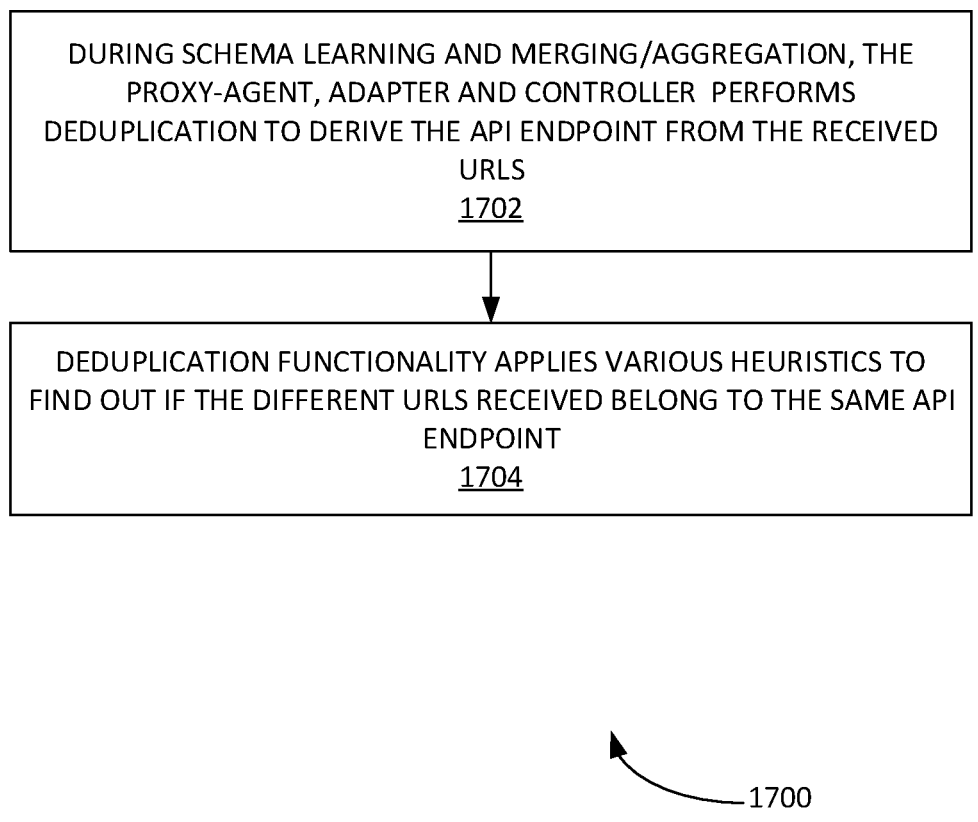
FIG. 17 illustrates an example process for the deduplication of learned API endpoints, according to some embodiments.

FIG. 17 illustrates an example process 1700 for the deduplication of learned API endpoints, according to some embodiments. In step 1702, during schema learning and merging/aggregation, the proxy-agent, adapter and controller performs deduplication to derive the API endpoint from the received URLs. In step 1704, the deduplication functionality applies various heuristics to find out if the different URLs received belong to the same API endpoint. The heuristics can include parts of a URL path that are integers, hexadecimal numbers and UUID strings are considered as variable and de-duped into a single path. The heuristics can include parts of a URL path that are strings are allowed to be separate for a specified maximum limit and then are reduced to a single API endpoint once the specified max limit is exceeded. The received URL is converted into a regex. The future received URLs are matched to see if they match the regex as well. The heuristics can also include URLs that matches the same regex are considered to be the same API endpoint, etc.

Figure 18:
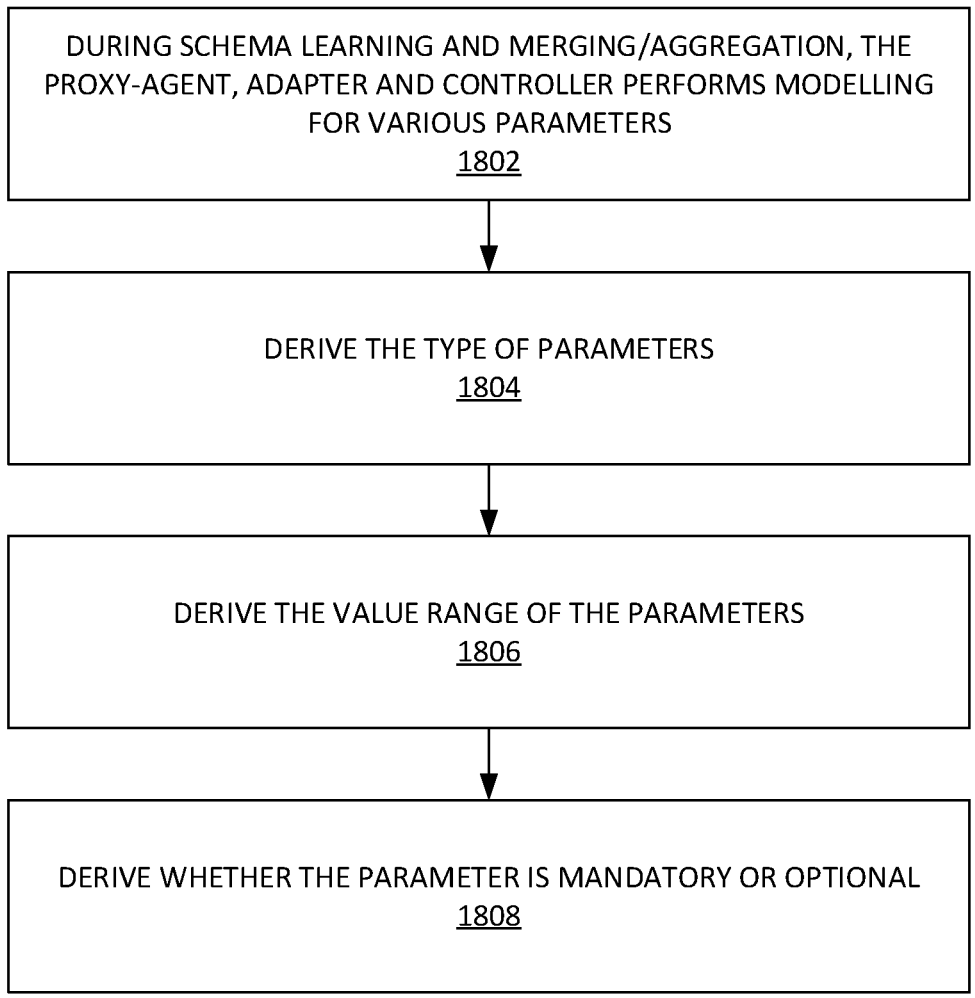
FIG. 18 illustrates an example process for implementing parameter modelling from learned schema, according to some embodiments.

FIG. 18 illustrates an example process 1800 for implementing parameter modelling from learned schema, according to some embodiments. In step 1802, during schema learning and merging/aggregation, the proxy-agent, adapter and controller performs modelling for various parameters. In step 1804, process 1800 can derive the type of parameters. This can include, inter alia: basic types (such as integer, string, enums); complex types (e.g. objects, arrays, arrays of arrays, etc.) etc. In step 1806, process 1800 can derive the value range of the parameters. This may include a min and max value (e.g. most commonly occurring value or the largest size of the value, etc.). In step 1808, process 1800 can derive whether the parameter is mandatory or optional. This can include determining if the parameter is always present or is optional.

A process for implementing behavioral profiling of APIs, according to some embodiments is now discussed. During schema learning and merging/aggregation, the proxy-agent, adapter and controller perform behavioral profiling of the API. This includes, inter alia: average request/sec for the APIs; average size of the APIs; geolocation from where APIs are used; users that are using the APIs; time of the day of the APIs; sequence of the APIs, etc.

Figure 19:
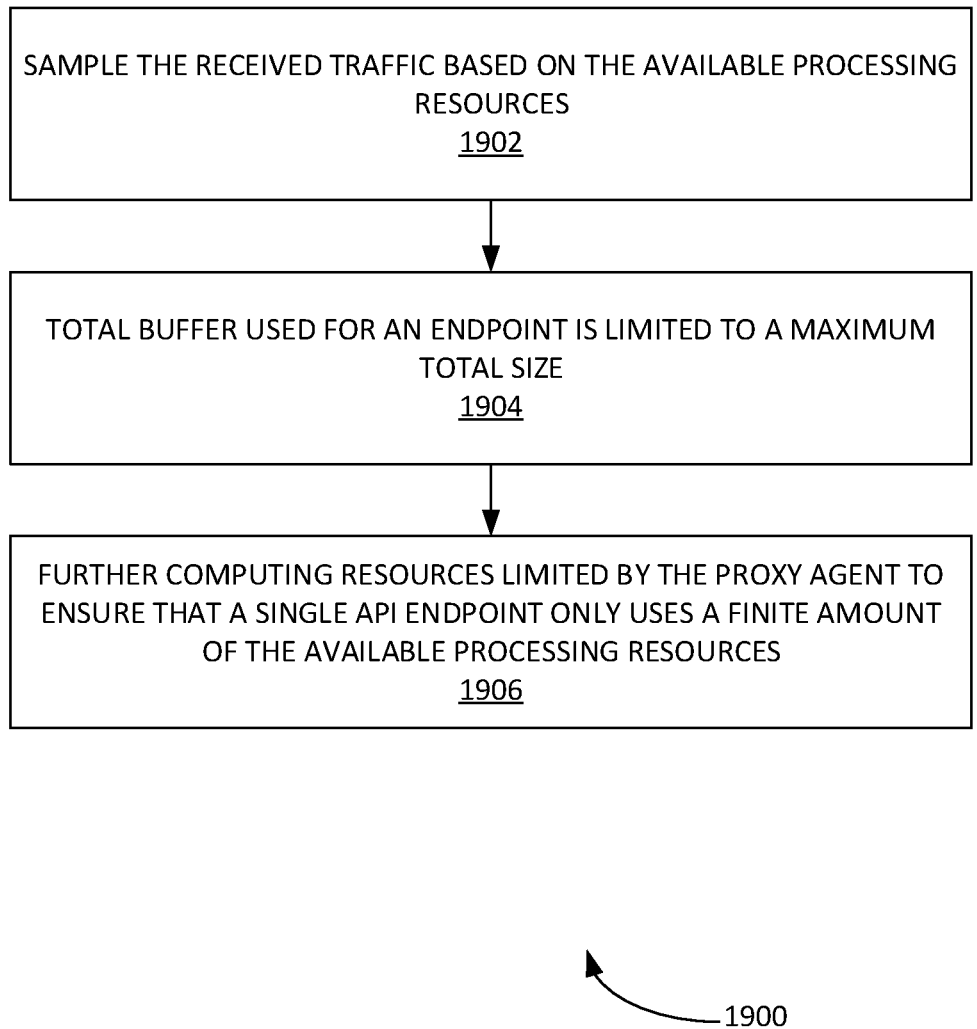
FIG. 19 illustrates an example process for implementing performance optimizations for LineRate processing, according to some embodiments.

FIG. 19 illustrates an example process 1900 for implementing performance optimizations for LineRate processing, according to some embodiments. The proxy agent can receive a large amount of traffic. In order to optimize traffic processing, the proxy agent can deploy steps 1902-1906 (among others).

In step 1902, process 1900 can sample the received traffic based on the available processing resources. In one example, the proxy agent can deploy sampling techniques to limit the per API end point processing requirements. For each API endpoint, the proxy agent maintains N buffers at a given time. N can be configured as a policy with a reasonable default. The API discovery filter checks to see if a buffer is available for the payload to be buffered. If a buffer is available, the API payload (request body as well as response body) is copied over to the buffer as and when request and response payloads are received. The buffered payload then is processed for deriving the schema and information.

In addition to limiting the used buffer by a count, the total buffer used for an endpoint can further be limited to a maximum total size in step 1904. In step 1906, further computing resources can be limited by the proxy agent to ensure that a single API endpoint only uses a finite amount of the available processing resources. For example, an offline API discovery timer function processes the buffers and performs schema derivation on the buffered payloads. The timer function is executed such that it triggers every T ms and process X buffers for a given API endpoint at a given time. Both T and X can be configurable. T can be 100 ms by default and X is 1 by default, thus, making T and X configurable. Process 1900 can choose a suitable default provides protection against heavy CPU usage during API discovery.

Figure 20:
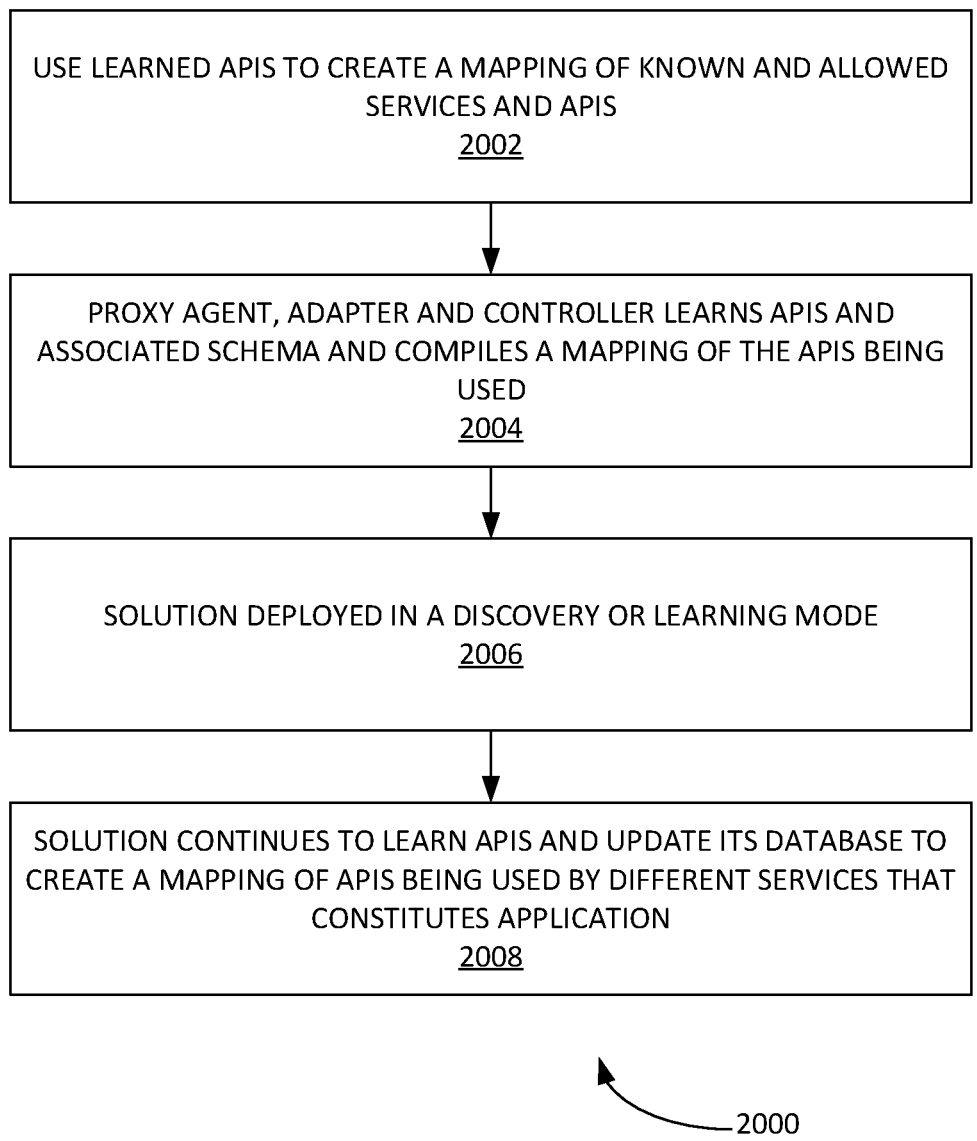
FIG. 20 illustrates an example process for implementing a discovery/learning phase, according to some embodiments.

FIG. 20 illustrates an example process 2000 for implementing a discovery/learning phase, according to some embodiments. Process 2000 can use learned APIs to create a mapping of known and allowed services and APIs in step 2002. In step 2004, the proxy agent, adapter and controller learns APIs and associated schema thereof and compiles a mapping of the APIs being used between various segments of a distributed application. In step 2006, the solution can be deployed in a discovery or learning mode. In this mode, in step 2008, the solution continues to learn APIs and update its database to create a mapping of APIs being used by different services that constitutes application. It is noted that mapping can include, inter alia: a list of all discovered services that are active and are interacting using APIs; a list of APIs that is being used between any given pair of services; a list of APIs that are used between external entities and services. For each of the API learned, further information can be collected that may include, inter alia: an API endpoint; an API Schema (e.g. the model of the schema parameters, etc.); API Behavioral profiling; etc.

Figure 21:
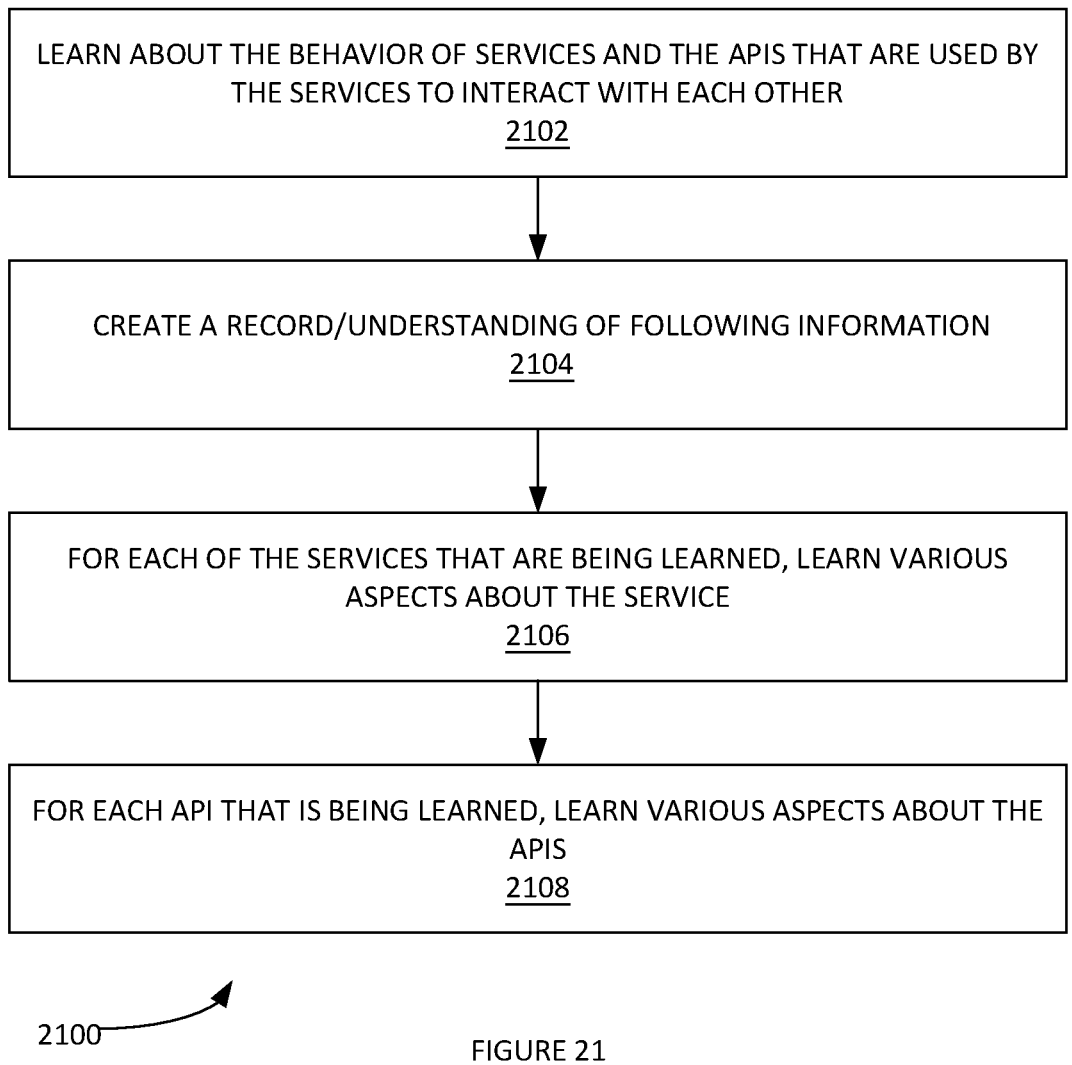
FIG. 21 illustrates an example process of an enforcing phase implementation, according to some embodiments.

FIG. 21 illustrates example learning mode of operation 2100, according to some embodiments. It is noted that systems 100 and 200 can be operated in two modes of operation: learning mode and enforcing mode. In learning mode of operation, process 2100 can learn about the behavior of services and the APIs that are used by the services to interact with each other in step 2102. In step 2104, process 2100 then creates a record/understanding of following information, inter alia:

The services that are currently active in the environment. Process 2100 can discover which services are currently active in the environment using various mechanism that may include but not limited to the using the service discovery mechanism/APIs provided by the platform on which application is deployed on (e.g. container platforms such as Kubernetes, virtualization platforms such as VMware® and public cloud platforms such as AWS EC2®, Microsoft Azure® or Google cloud engine etc.). In another embodiment, the service discovery can be based on manually entered configuration in the system.

How the services are interacting with each other (e.g. which service is communicating with other service; This information can be derived using various mechanisms that may include but not limited to the traffic information being received from distributed proxy agent and/or the using the traffic discovery mechanism/APIs provided by the platform on which application is deployed on (e.g. container platforms such as Kubernetes, virtualization platforms such as VMware and public cloud platforms such as AWS EC2®, Microsoft Azure® or Google® cloud engine etc.).

Categorizing the services in different groups that are based on the attributes of the services interactions. For example, services that are receiving API requests from external environments can be categorized as external facing services, services that are only communicating to internal services can be categorized as internal services; and services that are sending the API requests to external environments can be categorized as the services that are egress services. It is noted that the external environment is the environment that may be a partner or third-party external application.

System learns the interactions between the services and can make it available to the administrator as a service dependency map that allows the administrator to know how services are interacting with each other.

In step 2106, for each of the services that are being learned, process 2100 can learn various aspects about the service that may include, inter alia:

Resource usage of each of the services in terms of CPU, Memory, Network and Disk etc.;

Interaction between services can be in various networking and application protocols such as including but not limited to TCP, MySQL, Redis, Kafka and HTTP and the other application layer protocols. System learns the interaction and the information between the services and learns the details of interactions that is needed for profiling the behavior of the service within the context of the application protocol.

In one instance for example if the service is using MySQL protocol, system can collect information such as MySQL tables, schema of the MySQL tables and access rate and pattern of the accessing data from MySQL based database by the service.

In another instance for example if the service is using Kafka protocol, system can collect information such as Kafka topics, structure of the data being read and written to Kafka topic, access rate and pattern of accessible data using various Kafka topics by the application.

In another instance for example if the service is using HTTP protocol and is communicating using REST or any other (GRPC, XML etc.) type of APIs, system can learn the behaviors of services by collecting information that includes but not limited to as described infra.

The APIs are being used between services and/or a set of given two services; The information around each of the API can have various aspects The activity level of the service using criteria such as the rate at which service is receiving or sending the APIs requests The throughput at the service in terms of the amount of the data being transmitted using APIs; and The invocation sequence of the APIs. Invocation sequence is defined as the relative order in which APIs are being invoked. For example, if a service invokes the API A before API B, the invocation sequence of API is A followed by B.

For each of the API learned, in step 2106, further information is collected that may include but not limited to as described above related to API endpoint, parameter modelling and the behavioral profiling relates sections. In step 2108, for each API that is being learned, process 2100 can learn various aspects about the APIs that may include, inter alia:

Schema of the API; Schema of the API governs the format and structure of the API. This can be defined differently based on different API specs such as OpenAPI or based on API's protocol such as XML, JSON or GRPC etc. The schema consists of the definition of data elements (also referred to as parameters herein) that are used to carry data in API payload.

Rate (requests/sec) at which API is being invoked;

Invocation sequence of the API with respect to the other APIs;

Origin (e.g. geo-location) of the API; Origin can be further specified in terms of the service that is originating the API and User IDs that is associated with the API requests.

This information is learned as an aggregate information for all the APIs as well as in the context for a specific pair of services that are interacting with each other.

It is noted that automatic categorization/annotation of APIs based on learned behavior can be implemented. Based on the learned behavior APIs can be annotated. The attributes used for API annotations can be multiple including but not limited to attributes such as payload related attributes. For example, if the payload of an API has a sensitive information (such as credit card number or other type of sensitive information), API can be marked as "sensitive" API and can be categorized as sensitive API. Similarly, the attributes used for API annotations can be related to usage pattern of the API. For example, if API is being accessed from external users, it can be marked as "external" API. Similarly, The other attributes may include but not limited to specific services using the APIs as well as other usage or traffic related attributes such as APIs rate, size, error response etc.

Figure 22:
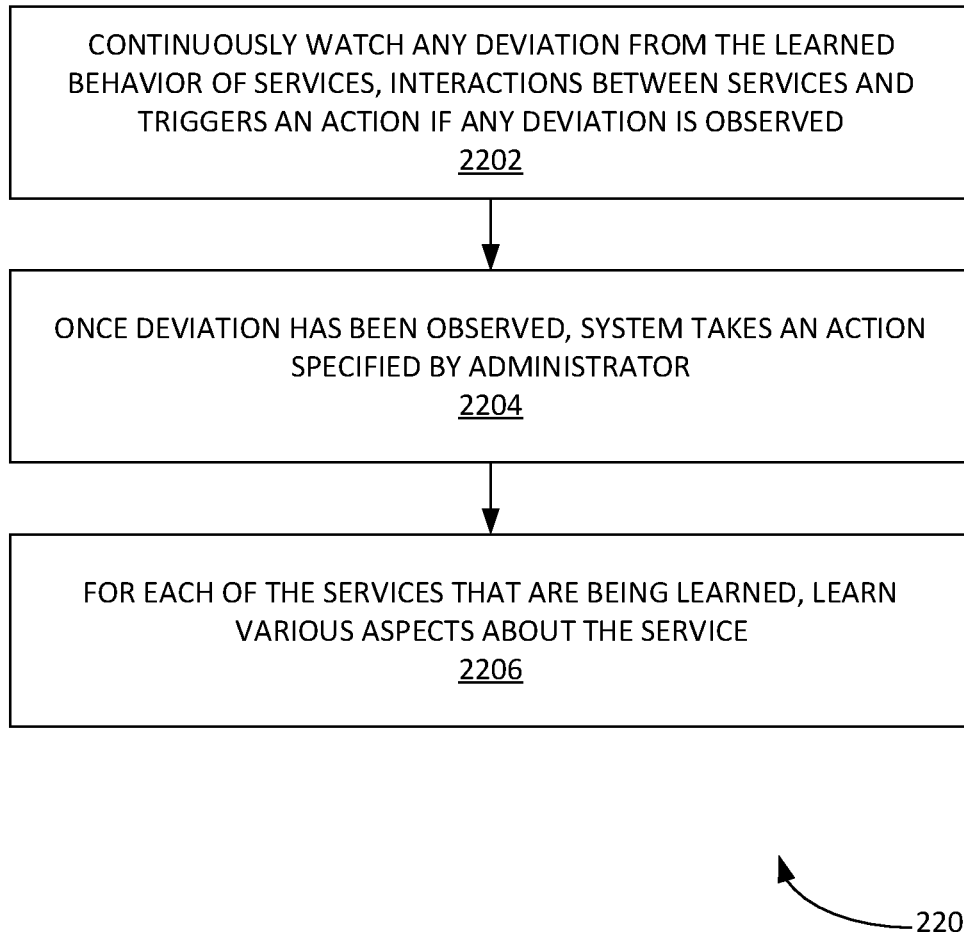
FIG. 22 illustrates an example process of an enforcing phase implementation, according to some embodiments.

FIG. 22 illustrates an example process 2200 of an enforcing phase implementation, according to some embodiments. In enforcing mode, in step 2202, process 2200 continuously watches any deviation from the learned behavior of services, interactions between services and triggers an action if any deviation is observed. Example deviations can include, inter alia: when a new service is discovered that was previously not seen during learning phase; a new interaction between services is observed that was previously not seen during learning phase, Deviation from the learned state is computed by observing a new behavior of the service within the context of the application protocol. Interaction between services can be in various networking and application protocols such as including but not limited to TCP, MySQL, Redis, Kafka and HTTP and the other application layer protocols.

In one instance for example if the service is using MySQL protocol, system can consider access to a new MySQL tables, a new schema of the existing MySQL tables and or a new access rate and pattern of the accessing data from MySQL based database by the service that was not seen previously during learning mode.

In another instance for example if the service is using Kafka protocol, system can consider information such as a new Kafka topics, new structure of the data being read and written to Kafka topic, new access rate and or the new pattern of accessible data using various Kafka topics by the application that was not seen previously during learning mode.

In another instance for example if the service is using HTTP protocol and is communicating using REST or any other (GRPC, XML etc.) type of APIs, system can consider various type of observed behavior that includes but not limited to as described in the following paragraphs infra as the deviations.

A new API is discovered between any given pair of services or between a service and external entities that was not observed during the learning phase; or when, for a given API, a new parameter is observed that was not part of learned schema; when, for a given API, an existing parameter with a different value is observed, such that the new value is not matching with the learned schema either in terms of its type or its value; when, for a given API, a new behavior is observed; etc.

Figure 23:
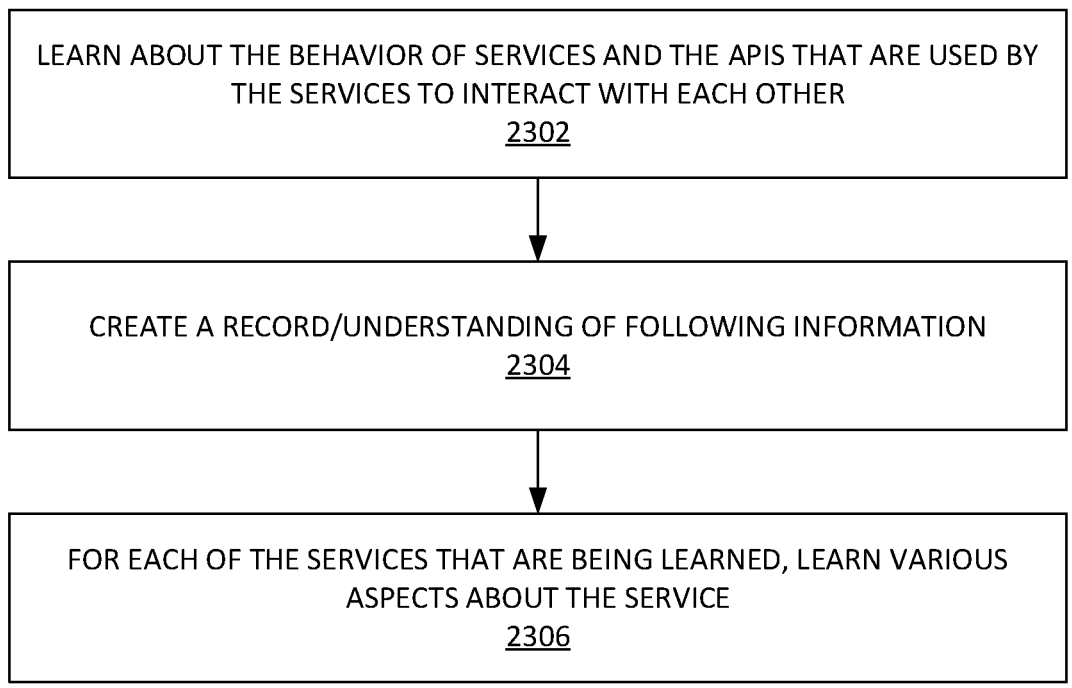
FIG. 23 illustrates an example process for implementing an enforcing mode, according to some embodiments.

FIG. 23 illustrates an example process 2300 for implementing an enforcing mode, according to some embodiments. System can be switched to a mode that is referred to as enforcing mode. In enforcing mode, process 2300 checks if there are any deviations from the state that it collected during the learning phase in step 2302. These deviations may include, inter alia:

A new service that was not seen previously during learning mode and has become active in the environment;

A new pair of services start to interact with each other that were not seen previously interacting during learning mode;

A known service start to use a new API that it was not previously used during learning mode;

A known service start to use a known API but with a different service that was not previously used;

A new service start to interact with the external users or the applications that were not used before;

A rate at which the service was using/invoking APIs or a specific API changes;

An amount of data that is transmitted or received by the service changes; and

An invocation sequence in which the service was invoking the APIs changes.

In step 2304, for a given API, a possible deviation from the learned state can be determined. The possible deviation from the learned state can be, inter alia:

The schema of the API changes. For example, for a given API, a new schema parameter is observed that was not part of learned schema; when, for a given API, an existing parameter with a different value is observed, such that the new value is not matching with the learned schema either in terms of its type or its value; when, for a given API, a new behavior is observed; etc.

The amount of data that is transmitted or received by the API changes;

The rate at which the API is being invoked changes;

The invocation sequence in which the API is being invoked changes;

The request origin (geo-location) changes; and if the user IDs that is associated with the API requests changes (e.g. a new user starts to use the API).

Once a deviation has been observed, system can take an action specified by the administrator of the system in step 2204. Example actions can include, inter alia: logging the deviation; sending an alert to the administrator using specified alert mechanism such as email, text or any other mechanism; generating an event that integrates with another system; blocking the API requests in the network such that the APIs are not allowed to complete; etc.

Blocking the API requests in the network such that the APIs are not allowed to complete can include, inter alia: silently dropping the API requests; redirecting the original request to another API; sending back and error response; etc.

In step 2306, once a deviation has been noticed, process 2300 can take specified actions, including, inter alia:

The service that is associated with the deviation can be shut down or stopped;

System can drop the API requested being made and can prevent service from being able to send and receive APIs from other services;

System can take some other mitigation actions such as rate limiting of API requests, modifying the payload or other contents of the API requests.

System can notify administrator of the service or application about the deviation using a notification mechanism including but not limited to such as email, events etc.;

System may log the deviation as an event into a logging subsystem such as file or logging server; and System can raise alert in a form that is applicable to the environment in which application has been deployed.

Once a deviation has been observed, system can also allow an override option for administrators. Administrators can review the deviation observed and administrator then can override it by accepting the deviation. Accepting the deviation implies that the observed deviation is an acceptable behavior and system should update its learned state. Once a deviation has been overridden by admins, from that point onward, system updates its learned state and consider the behavior that caused deviation to be an acceptable or expected behavior and do not raise any alerts or notifications for the accepted behavior.

Once a deviation has been observed, system can also allow an option to create a policy that either allows, denies or reject the behavior that caused the deviation. Administrators can review the deviation observed and administrator then can create the policy for action on the current and future occurrence of the deviation. In one embodiment, the policy can be auto-generated by the system with appropriate controls as desired by the administrator to either accept or deny the deviating behavior.

The system can combine learned state with the configured state about the services and APIs. Administrators can augment the learned behavior with providing system the additional information about the behavior of services and APIs through system provided policies.

The system learned state can be preserved across multiple deployment environments of the application as well across multiple instances of the applications. For example, system can be deployed in a test or development environment and can be made to learn in the test or development environments. System then can be deployed in production environment and can be used in enforcing mode based on the learned state in test and development environment.

The system's ability to learn the behavior of application services and APIs and then be able to calculate any deviation from the learned behavior can also be described as automated whitelisting of application services and APIs behavior. In one instance of implementation system while in learning mode can create automated policies that describes the behavior and interaction of services and APIs. These policies then behave like whitelist policies such that while system switches over to enforcing state, only the behavior and interaction that is known/learned is allowed. Any behavior or interaction that doesn't match the policies is then considered as a violation and results into the various actions as described above. Additionally, the automatically generated policies can be made available to the administrator for their review as well as customization.

Figure 24:
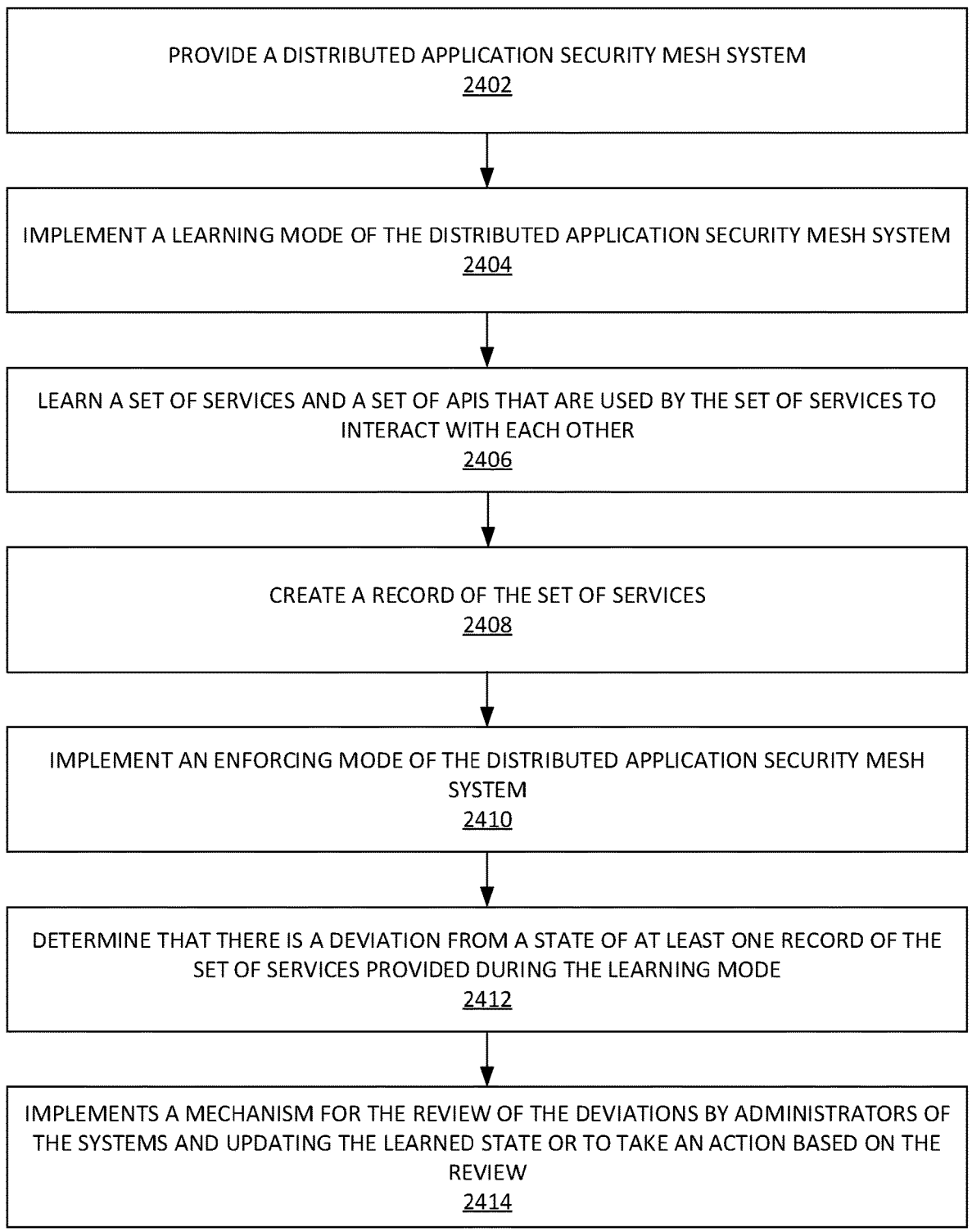
FIG. 24 illustrates a computerized method for securing an application based on auto-learning and auto-mapping of application services and application programming interfaces (APIs), according to some embodiments.

FIG. 24 illustrates a computerized method for securing an application based on auto-learning and auto-mapping of application services and application programming interfaces (APIs), according to some embodiments. In step 2402, process 2400 provides a distributed application security mesh system. In step 2404, process 2400 implements a learning mode of the distributed application security mesh system. In step 2406, process 2400 learns a set of services and a set of APIs that are used by the set of services to interact with each other.

The set of services are discovered, inter alia: using a service discovery mechanism provided by a platform on which the application is deployed; using a manually entered configuration of the platform on which the application is deployed; and using traffic inspection in the application environment.

The service can include an application service. In step 2408, process 2400 creates a record of the set of services. The record includes a list of services that are currently active in a specified environment of the distributed application security mesh system, and a list of interactions of the services. Process 2400 can categorize each service of the set of services into a set of different categories that are based on the attributes of the service interactions of each service. The attributes include, inter alia: a protocol of the service, an administrator assigned attribute to the service, and/or an administrator assigned attribute to the API that is being provided by the service when the service is interacting with external users or external services.

In step 2410, process 2400 implements an enforcing mode of the distributed application security mesh system. In step 2412, process 2400 determines that there is a deviation from a state of at least one record of the set of services provided during the learning mode. In step 2414, process 2400 implements a mechanism for the review of the deviations by administrators of the systems and updating the learned state or to take an action based on the review.

In one example, process 2400 can generate a service dependency map from the list of interactions of each service of the list of services. Process 2400 can also generate an API dependency map from the list of API interactions of each service of the list of services.

In one example, the step of learning a set of services and a set of APIs that are used by the set of services to interact with each other, wherein the learning of the services and APIs comprises the step of determining the various services that are interacting with each other and are active in the environment. It can include the step of determining the categories of various services that are interacting with each other and are active in the environment. It can include the step of determining all the unique pairs or segments of services that interact with each other. It can include the step of determining a rate of requests per second at which each API of the set of APIs is invoked. It can include the step of determining an invocation sequence of each API of the set of APIs with respect to the other APIs of the set of APIs. It can include the step of determining the resource usage of the services in terms of CPU, memory and network usage. It can include the step of determining the resource usage of the APIs in terms of CPU, memory and network usage.

In one example, the step of determining that there is a deviation from a state of at least one record of the set of services provided during the learning mode and for each API of the set of APIs, determining a deviation from the learned state, wherein the deviation from the learned state includes, inter alia: a new service that was not seen previously during learning mode and has become active in the environment; a new pair of services start to interact with each other that were not seen previously interacting during learning mode; and a new pair of services categories to interact with each other that were not seen previously interacting during learning mode.

In one example, for each API of the set of APIs, process 2400 can determine a deviation from the learned state. The deviation from the learned state can be a rate at which the service was invoking APIs or a specific API changes, an amount of data that is transmitted or received by the service changes, and/or an invocation sequence in which the service was invoking the APIs changes.

In one example, process 2400 can implement the enforcing mode of the distributed application security mesh system by communicating the deviation to a system administrator. It can allow the administrator to be able to review the deviation either manually or programmatically through a script. It can implement an action specified by the system administrator. It can block the interaction between services such that the deviation is no longer observed. It can block the specific service that is causing deviation such that deviation is no longer observed. It can block a specific API that is causing deviation such that the deviation is no longer observed. It can log the interaction between services such that the deviating behavior is logged but the services are allowed to interact. It can log the activity from a specific service such that the deviating behavior is logged but the service is allowed to be active in the environment. It can log the specific API requests and responses such that deviating behavior is logged but the API is continued to be allowed in the environment.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method comprising:
providing a distributed application security mesh system comprising a controller and a plurality of distributed proxy agents implemented within a cloud computing platform;

implementing a learning mode of the distributed application security mesh system, the learning mode comprising:

learning a state for each application service of a set of application services of the cloud computing platform and a set of APIs that are used by respective application services of the set of application services to interact with each other, wherein learning the state of the set of application services and the set of APIs comprises:

determining, as the set of application services, those application services that are i) active in an environment of the distributed application security mesh system and ii) that are interacting with one or more other application services or external users, determining one or more categories for each application service of the set of application services based on attributes of interactions of the application service with one or more other application services, and determining unique pairs of interacting application services; and implementing an enforcing mode of the distributed application security mesh system, the enforcing mode comprising:

determining that there is a deviation in a state of a particular application service from the learned state for each application service of the set of application services, and performing an action in response to determining the deviation.

2. The computerized method of claim 1, wherein the set of application services are learned based on one or more of:

using a service discovery mechanism provided by a platform on which the application is deployed;

using a manually entered configuration of the platform on which the application is deployed; or using traffic inspection in the application environment.

3. The computerized method of claim 1, wherein the attributes used to determine the one or more categories for each application service comprise one or more of:

a protocol of the application service, an administrator assigned attribute to the application service, or an administrator assigned attribute to the API that is being provided by the application service when the application service is interacting with external users or external services.

4. The computerized method of claim 1 further comprising:

generating a service dependency map from the list of interactions of each application service of the list of application services; and generating an API dependency map from the list of API interactions of each application service of the list of application services.

5. The computerized method of claim 1, wherein the learning of the state for each of the application services and APIs comprises:

determining APIs used by each application service to interact with one or more other application services;

determining the application services that are interacting with external users or services; and determining a schema of the set of APIs, wherein the schema of an API governs the format and structure of the API.

6. The computerized method of claim 5, wherein the learning of the state of each of the application services and APIs comprises:

determining a rate of requests per second at which each API of the set of APIs is invoked;

determining an invocation sequence of each API of the set of APIs with respect to the other APIs of the set of APIs; and determining an amount of data that is transmitted or received by the application service.

7. The computerized method of claim 6, wherein the learning of the state of each of the application services and APIs comprises:

determining the resource usage of the application services including one or more of CPU, memory, or network usage; and determining the resource usage of the APIs including one or more of CPU, memory, or network usage.

8. The computerized method of claim 1, wherein determining that there is a deviation in a state of a particular application service from the learned state for each application service of the set of application services comprises:

for each API of the set of APIs, determining a deviation from the learned state, wherein the deviation from the learned state comprises one or more of:

determining that a new application service that was not determined to be in the set of application services during the learning mode and has become active in the environment;

determining a new unique pair of interacting application services that was not determined during the learning mode; or determining a new category for a particular application service of the set of application services than the one or more categories for the particular application service determined during the learning mode.

9. The computerized method of claim 1, wherein determining that there is a deviation in a state of a particular application service from the learned state for each application service of the set of application services comprises:

for each API of the set of APIs, determining a deviation from the learned state, wherein the deviation from the learned state comprises one or more of:

determining that a particular application service of the set of application services starts using an API that it was not previously used by the particular application service during the learning mode; or determining that a particular application service of the set of application services starts to interact with external users or applications that were not determined as interactions during the learning mode.

10. The computerized method of claim 1, wherein determining that there is a deviation in a state of a particular application service from the learned state for each application service of the set of application services comprises:

for each API of the set of APIs, determining a deviation from the learned state, wherein the deviation from the learned state comprises one or more of:

a change in a rate at which the application service invokes the API;

a change in an amount of data that is transmitted or received by the application service; or a change in an invocation sequence in which the application service invokes the API.

11. The computerized method of claim 1, wherein determining that there is a deviation in a state of a particular application service from the learned state for each application service of the set of application services comprises:
　for each API of the set of APIs, determining a deviation from the learned state, wherein the deviation from the learned state comprises one or more of:
　　a change in a schema of the API;
　　a change in a request origin geo-location; or
　　a change in a user identifier associated with an API request; and
　in response to determining the deviation, a specified application service associated with the deviation is shut down, stopped or mitigated in a specified manner.

12. The computerized method of claim 1, wherein implementing the enforcing mode of the distributed application security mesh system further comprises:
　communicating the deviation to a system administrator for review either manually or programmatically through a script; and
　wherein performing the action comprises implementing a particular action specified by the system administrator.

13. The computerized method of claim 1, wherein performing the action in response to determining the deviation comprises one or more of:
　blocking the interaction between application services such that the deviation is no longer observed;
　blocking the specific application service that is causing deviation such that deviation is no longer observed; or
　blocking a specific API that is causing deviation such that the deviation is no longer observed.

14. The computerized method of claim 1, wherein performing the action in response to determining the deviation comprises one or more of:
　logging the interaction between application services such that the deviating behavior is logged but the application services are allowed to interact;
　logging the activity from a specific application service such that the deviating behavior is logged but the application service is allowed to be active in the environment; or
　logging the specific API requests and responses such that deviating behavior is logged but the API is continued to be allowed in the environment.

15. The computerized method of claim 1, wherein performing the action in response to determining the deviation comprises one or more of:
　remediating the deviation by controlling a rate of API requests; or
　accepting the deviating behavior such that the specific deviating behavior then is added to the learned state that the a subsequent instance of the behavior does not lead to a determination of a deviation.

16. A system comprising:
　a plurality of hardware computing devices configured to implement respective application services of a cloud-computing platform; and
　a distributed application security mesh comprising a controller and a plurality of proxy agents implemented within the cloud computing platform, the distributed application security mesh configured to provide a learning mode and an enforcement mode,
　wherein the learning mode comprises:
　　learning a state for each application service of a set of application services of the cloud computing platform and a set of APIs that are used by respective application services of the set of application services to interact with each other, wherein learning the state of the set of application services and the set of APIs comprises:
　　　determining, as the set of application services, those application services that are i) active in an environment of the distributed application security mesh system and ii) that are interacting with one or more other application services or external users,
　　　determining one or more categories for each application service of the set of application services based on attributes of interactions of the application service with one or more other application services, and
　　　determining unique pairs of interacting application services; and
　wherein the enforcement mode comprises:
　　determining that there is a deviation in a state of a particular application service from the learned state for each application service of the set of application services, and
　　performing an action in response to determining the deviation.

17. One or more non-transitory machine readable media comprising instructions that when executed by a data processing system causes the data processing system to perform operations comprising:
　providing a distributed application security mesh system comprising a controller and a plurality of distributed proxy agents implemented within a cloud computing platform;
　implementing a learning mode of the distributed application security mesh system, the learning mode comprising:
　　learning a state for each application service of a set of application services of the cloud computing platform and a set of APIs that are used by respective application services of the set of application services to interact with each other, wherein learning the state of the set of application services and the set of APIs comprises:
　　　determining, as the set of application services, those application services that are i) active in an environment of the distributed application security mesh system and ii) that are interacting with one or more other application services or external users,
　　　determining one or more categories for each application service of the set of application services based on attributes of interactions of the application service with one or more other application services, and
　　　determining unique pairs of interacting application services;
　implementing an enforcing mode of the distributed application security mesh system, the enforcing mode comprising:
　　determining that there is a deviation in a state of a particular application service from the learned state for each application service of the set of application services, and
　　performing an action in response to determining the deviation.

\* \* \* \* \*

UNITED STATES PATENT AND TRADEMARK OFFICE
CERTIFICATE OF CORRECTION

| | | |
|---|---|---|
| PATENT NO. | : 11,645,144 B2 | Page 1 of 1 |
| APPLICATION NO. | : 16/694823 | |
| DATED | : May 9, 2023 | |
| INVENTOR(S) | : Amit Jain et al. | |

It is certified that error appears in the above-identified patent and that said Letters Patent is hereby corrected as shown below:

On the Title Page

Item (54) and in the Specification, Column 1, Lines 1-4, Delete the title and replace it with the following title --SECURING AN APPLICATION BASED ON AUTO-LEARNING AND AUTO-MAPPING OF APPLICATION SERVICES AND APIS--.

Signed and Sealed this
Twentieth Day of June, 2023

Katherine Kelly Vidal
*Director of the United States Patent and Trademark Office*